(12) United States Patent
Tang et al.

(10) Patent No.: US 11,489,993 B2
(45) Date of Patent: Nov. 1, 2022

(54) CAMERA ASSEMBLY AND ELECTRONIC DEVICE

(71) Applicant: Huawei Technologies Co., Ltd., Shenzhen (CN)

(72) Inventors: Wei Tang, Tokyo (JP); Na Wang, Shanghai (CN); Guangfeng Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/417,665

(22) PCT Filed: Dec. 2, 2019

(86) PCT No.: PCT/CN2019/122354
§ 371 (c)(1),
(2) Date: Jun. 23, 2021

(87) PCT Pub. No.: WO2020/134879
PCT Pub. Date: Jul. 2, 2020

(65) Prior Publication Data
US 2021/0352198 A1     Nov. 11, 2021

(30) Foreign Application Priority Data
Dec. 24, 2018 (CN) .......................... 201811584395.9

(51) Int. Cl.
*H04N 5/225*     (2006.01)
*G01S 17/89*     (2020.01)
(Continued)

(52) U.S. Cl.
CPC ........... *H04N 5/2257* (2013.01); *G01S 17/89* (2013.01); *H04M 1/0264* (2013.01); *H04N 5/2253* (2013.01); *H04N 5/38* (2013.01)

(58) Field of Classification Search
CPC ...... H04N 5/2257; H04N 5/2253; H04N 5/38; H04N 5/2251; H04N 5/2254;
(Continued)

(56) References Cited

U.S. PATENT DOCUMENTS 9,759,988 B2    9/2017   Rammah et al.
2006/0121756 A1*   6/2006   Kuo .................... H01R 12/7076
                                                                         439/76.1
(Continued)

FOREIGN PATENT DOCUMENTS

CN          201681044 U     12/2010
CN          107153236 A      9/2017
(Continued)

*Primary Examiner* — Abdelaaziz Tissire
(74) *Attorney, Agent, or Firm* — Conley Rose, P.C.

(57) ABSTRACT

A camera assembly includes a time-of-flight module and a circuit board. The circuit board is provided with an avoidance space. The time-of-flight module includes a transmit module and a receive module. The transmit module is configured to emit a detection optical signal. The receive module is configured to receive an induction optical signal formed after the detection optical signal is reflected by a to-be-measured object. The receive module is located in the avoidance space. A connection end of the receive module is fixed to the circuit board. The transmit module is located around the receive module and fixed to the circuit board.

20 Claims, 14 Drawing Sheets

(51) Int. Cl.
 *H04M 1/02* (2006.01)
 *H04N 5/38* (2006.01)

(58) Field of Classification Search
 CPC ............ H04N 1/00307; H04M 1/0264; H04M 1/0277; H04M 1/026; H04M 1/0266; H04M 2250/52; H04M 2250/20; G01S 7/481
 See application file for complete search history.

(56) References Cited

U.S. PATENT DOCUMENTS

| | | | | |
|---|---|---|---|---|
| 2006/0216996 | A1* | 9/2006 | Chen | H01R 13/6594 439/71 |
| 2008/0026626 | A1* | 1/2008 | Ma | H01R 12/7076 439/330 |
| 2008/0122967 | A1* | 5/2008 | Huang | G02B 7/08 348/340 |
| 2009/0017867 | A1* | 1/2009 | Koh | H04N 5/2257 455/556.1 |
| 2011/0177712 | A1* | 7/2011 | Tu | H04N 5/2253 439/366 |
| 2013/0075595 | A1* | 3/2013 | Ruh | G01S 17/04 250/221 |
| 2014/0063821 | A1* | 3/2014 | Hegde | H05K 3/323 362/382 |
| 2014/0313403 | A1* | 10/2014 | Chen | H04N 5/2257 348/373 |
| 2015/0069113 | A1* | 3/2015 | Wang | H01S 5/0237 228/102 |
| 2016/0050346 | A1* | 2/2016 | Liu | G01S 7/4813 348/46 |
| 2016/0323562 | A1 | 11/2016 | Nawasra et al. | |
| 2017/0124392 | A1* | 5/2017 | Gu | H04N 5/2256 |
| 2017/0353004 | A1* | 12/2017 | Chen | H01S 5/02253 |
| 2018/0067212 | A1* | 3/2018 | Wilson | H04M 1/02 |
| 2018/0096489 | A1 | 4/2018 | Cohen et al. | |
| 2018/0176346 | A1* | 6/2018 | Wei | G06F 1/1658 |
| 2018/0176426 | A1* | 6/2018 | Wei | G06F 1/1658 |
| 2018/0267390 | A1* | 9/2018 | Kim | G03B 17/55 |
| 2018/0302538 | A1* | 10/2018 | Chen | H04N 5/2253 |
| 2019/0041909 | A1* | 2/2019 | Pakula | H04M 1/0202 |
| 2019/0094920 | A1* | 3/2019 | Qiu | H04N 5/2256 |
| 2019/0141172 | A1* | 5/2019 | Chen | H04N 5/2251 |
| 2019/0289278 | A1* | 9/2019 | Yeh | G01S 17/86 |
| 2019/0289280 | A1* | 9/2019 | Yeh | H04N 13/271 |
| 2020/0003870 | A1* | 1/2020 | Chen | G01S 7/4813 |
| 2020/0007669 | A1* | 1/2020 | Kwon | G09G 3/3208 |
| 2020/0041372 | A1* | 2/2020 | Lee | H01S 5/02257 |
| 2020/0185582 | A1* | 6/2020 | Jin | H01L 33/58 |
| 2021/0176449 | A1 | 6/2021 | Zhang | |

FOREIGN PATENT DOCUMENTS

| | | | | |
|---|---|---|---|---|
| CN | 107918459 | A | | 4/2018 |
| CN | 207382424 | U | | 5/2018 |
| CN | 108174075 | A | | 6/2018 |
| CN | 108259724 | A | | 7/2018 |
| CN | 108280984 | A | * | 7/2018 |
| CN | 108280984 | A | | 7/2018 |
| CN | 108471493 | A | | 8/2018 |
| CN | 108541304 | A | | 9/2018 |
| CN | 207926744 | U | | 9/2018 |
| CN | 207968553 | U | | 10/2018 |
| CN | 208158719 | U | | 11/2018 |
| CN | 108989783 | A | * | 12/2018 ............ G01S 17/42 |
| CN | 108989783 | A | | 12/2018 |
| CN | 109005348 | A | | 12/2018 |
| CN | 109040556 | A | | 12/2018 |
| CN | 109061603 | A | | 12/2018 |
| CN | 109451228 | A | | 3/2019 |
| DE | 102015115098 | A1 | | 3/2017 |
| EP | 3156824 | A1 | | 4/2017 |
| EP | 3340585 | A1 | | 6/2018 |
| EP | 3161912 | B1 | | 2/2020 |
| EP | 3886422 | A1 | | 9/2021 |
| JP | 2017084939 | A | * | 5/2017 ............ G03B 15/02 |
| KR | 20050044253 | A | * | 5/2005 ........ G02B 13/0035 |
| KR | 20130047169 | A | * | 5/2013 ............ H01L 33/48 |
| KR | 1469052 | B1 | * | 12/2014 ........... H01L 25/167 |
| KR | 20180017375 | A | | 2/2018 |
| KR | 20180023172 | A | * | 3/2018 ............ G03B 19/22 |
| RU | 157466 | U1 | | 12/2015 |
| WO | 2013054300 | A2 | | 4/2013 |
| WO | 2015200561 | A1 | | 12/2015 |

* cited by examiner

CAMERA ASSEMBLY AND ELECTRONIC DEVICE

CROSS-REFERENCE TO RELATED APPLICATIONS

This application is a U.S. National Stage of International Patent Application No. PCT/CN2019/122354 filed on Dec. 2, 2019, which claims priority to Chinese Patent Application No. 201811584395.9, filed on Dec. 24, 2018. Both of the aforementioned applications are incorporated herein by reference in their entireties.

TECHNICAL FIELD

This application relates to the field of electronic product technologies, and in particular, to a camera assembly and an electronic device to which the camera assembly is applied.

BACKGROUND

A main component for electronic devices to implement an imaging function is a camera module. A time-of-flight (time of flight, TOF) module is a common depth camera module, and may be configured to measure depth of field information. The time-of-flight module includes a transmit module and a receive module. To ensure detection performance of the time-of-flight module, the transmit module and the receive module usually need to be close enough, so that an overlapping area between a field of view of the transmit module and a field of view of the receive module is relatively large. On the conventional time-of-flight module, the transmit module and the receive module are fixed to a same printed circuit board, to meet a requirement of proximity of the transmit module and the receive module. In this way, because a relative location of the transmit module and the receive module is fixed and a cable outgoing direction of the printed circuit board is fixed, a location of an interactive hole that directly faces the transmit module and the receive module and that is on a cover plate of an electronic device to which the time-of-flight module is applied is also fixed. Consequently, the time-of-flight module can only be applied to electronic devices that have a specific appearance form, but is hardly applied to electronic devices that have other appearance forms, and the applicability is poor.

SUMMARY

Embodiments of this application provide a widely applicable camera assembly and an electronic device to which the camera assembly is applied.

According to a first aspect, an embodiment of this application provides a camera assembly, including a time-of-flight module and a circuit board. The circuit board is provided with an avoidance space. The time-of-flight module includes a transmit module and a receive module. The transmit module is configured to emit a detection optical signal. The receive module is configured to receive an induction optical signal formed after the detection optical signal is reflected by a to-be-measured object. The induction optical signal carries depth of field information of the to-be-measured object. The receive module may be a camera module. The receive module and the transmit module are individually packaged. The receive module is located in the avoidance space, and a connection end of the receive module is fixed to the circuit board. The receive module is electrically connected to the circuit board via the connection end. The transmit module is located around the receive module and fixed to the circuit board.

In this embodiment, the receive module and the transmit module are individually packaged. The receive module has a receiving field of view and a receiving axis, and the receiving axis is a central axis of the receiving field of view. The transmit module has a transmitting field of view and a transmitting axis, and the transmitting axis is a central axis of the transmitting field of view. Because the receive module is located in the avoidance space, and the connection end of the receive module is fixed to the circuit board, the receive module and the transmit module can be close to each other, so that a spacing between the receiving axis and the transmitting axis is sufficiently small, and coverage between the receiving field of view and the transmitting field of view is high, to meet a performance requirement of the time-of-flight module. In addition, the receive module and the transmit module are individually packaged, and there is no direct mounting or direct connection relationship between the receive module and the transmit module. Therefore, the transmit module and the receive module are arranged in a more flexible manner, and a plurality of arrangement structures may be formed, so that electronic devices to which the camera assembly is applied may have a plurality of appearance forms. In other words, the camera assembly can be applied to a plurality of electronic devices that have different appearance forms. The camera assembly is widely applicable. Because electronic devices that have a plurality of different appearance forms can use a same camera assembly, there is no need to repeatedly develop time-of-flight modules in different forms based on different appearance forms, thereby reducing developing costs and manufacturing costs of electronic devices.

The avoidance space may be a through hole or a groove disposed on the circuit board. The receive module is located in the avoidance space, so that the receive module can reuse a part or all of a thickness space of the circuit board, the camera assembly is arranged more compact, and a size of the camera assembly in a thickness direction Z of the electronic device is smaller.

In an implementation, the camera assembly further includes one or more camera modules. The camera module may be a color lens, a black and white lens, a wide-angle lens, or a zoom lens. The one or more camera modules are located in the avoidance space, and connection ends of the one or more camera modules are fixed to the circuit board. The one or more camera modules may collaboratively operate with the time-of-flight module, to improve performance of the electronic device. For example, when a picture captured by the time-of-flight module is combined with a picture captured by the color lens, a three-dimensional profile of the to-be-measured object may be presented in a graphic manner in which different colors represent different distances. This embodiment is described by using an example in which the camera assembly includes one camera module.

In an implementation, the camera assembly further includes a camera bracket located in the avoidance space. The camera bracket has a plurality of receiving grooves spaced apart from each other. Opening directions of the plurality of receiving grooves are the same. The receive module and the one or more camera modules are received in the plurality of receiving grooves in a one-to-one correspondence manner. The receive module and the one or more camera modules are spaced apart from each other, to avoid collision and damage due to accidental impact.

In this embodiment, the receive module and the one or more camera modules are received in the plurality of receiving grooves of the camera assembly, and are fixed opposite to the camera bracket. The camera bracket is located in the avoidance space, so that the receive module and the one or more camera modules are located in the avoidance space. The receive module, the one or more camera modules, and the camera bracket may achieve modularization through a separate assembly process before an overall assembly process of the camera assembly is performed, thereby simplifying steps of the overall assembly process of the camera assembly, and reducing assembly difficulty.

The receive module and the one or more camera modules may be adhered to bottom walls of the plurality of receiving grooves through an adhesive member, to be fixed opposite to the camera bracket. The camera bracket may be made of a material with high thermal conductivity, for example, copper, aluminum foil, stainless steel, or another metal material. The adhesive member may be doped with thermally conductive particles (for example, graphite particles or metal particles) or made of a thermally conductive adhesive material.

In this embodiment, heat emitted by the receive module and the one or more camera modules can be conducted to the camera bracket through the adhesive member, and heat dissipation is performed by using the camera bracket, to ensure reliability of operation of the camera assembly.

The camera bracket further has a plurality of connection notches. The plurality of connection notches are in communication with the plurality of receiving grooves to the outside of the camera bracket in a one-to-one correspondence manner. The connection end of the receive module and the connection ends of the one or more camera modules extend out of the plurality of receiving grooves via the plurality of connection notches in a one-to-one correspondence manner, to be fixed to the circuit board.

In an implementation, the camera assembly further includes a fixing bracket. The circuit board is fixed to the fixing bracket. The circuit board may be fixed to the fixing bracket through a fastener. For example, the fixing bracket includes a first surface and a second surface that are disposed opposite to each other. The fixing bracket has a mounting boss and a mounting hole. The mounting boss protrudes from the first surface. The mounting hole is recessed from a top surface that is of the mounting boss and that is away from the first surface to a direction that is close to the second surface. The circuit board may abut against the top surface of the mounting boss. A connection hole corresponding to the mounting hole is disposed on the circuit board. The fastener runs through the connection hole and extends into the mounting hole, so that the circuit board is tightly fastened to the fixing bracket. The fastener, the structure of the connection hole, and the structure of the mounting hole form a fastening structure. A plurality of groups of fastening structures between the circuit board and the fixing bracket may be formed. The plurality of groups of fastening structures may be scattered in a peripheral area of the circuit board, so that the circuit board is more stably fixed to the fixing bracket.

The fixing bracket has a mounting groove. The mounting groove is recessed from the first surface to a direction that is close to the second surface. The camera bracket is fixed to the mounting groove. A bottom surface that is of the camera bracket and that faces away from the receiving groove may abut against a bottom wall of the mounting groove, to achieve mutual positioning between the two. A concave-convex matching structure may be disposed between the bottom wall of the mounting groove and the bottom surface of the camera bracket. For example, a protruding convex block may be disposed on the bottom wall of the mounting groove. A concave groove may be disposed on the bottom surface of the camera bracket. The convex block extends into the groove, so that the camera bracket is fixed opposite to the fixing bracket. In another embodiment, a groove is disposed on the bottom wall of the mounting groove, and a convex block is disposed on the bottom surface of the camera bracket. The convex block extends into the groove, so that the camera bracket is fixed opposite to the fixing bracket.

In this embodiment, because the circuit board is fixed to the fixing bracket, and the camera bracket is also fixed to the fixing bracket, mutual positioning between the circuit board and the camera bracket is achieved by using the fixing bracket, so that mutual positioning between the receive module mounted on the camera bracket and the transmit module fixed to the circuit board is achieved, and the relative location between the transmitting field of view and the receiving field of view is stable. In this way, the reliable operation of the time-of-flight module can be ensured, and the performance of the camera assembly is relatively good.

In an implementation, the camera assembly further includes a decorative part. The decorative part is located on one side that is of the receive module and that receives the induction optical signal. The decorative part includes a decorative ring and a protection board. The decorative ring has a top surface and a bottom surface that are disposed opposite to each other. A recessed limiting groove is disposed on the top surface of the decorative ring. The protection board is mounted in the limiting groove and abuts against a bottom wall of the limiting groove. The decorative part is provided with a plurality of mounting spaces. The plurality of mounting spaces are provided in the decorative ring. The mounting spaces are in communication with the limiting groove to a bottom surface of the decorative ring.

The receive module and the one or more camera modules are received in the plurality of mounting spaces. The receive module and the one or more camera modules are received in different mounting spaces in a one-to-one correspondence manner. The transmit module is located around the decorative part. In short, the receive module and the one or more camera modules are located inside the decorative part, and are surrounded by the decorative part, and the transmit module is located outside the decorative part.

In this embodiment, because the transmit module and the receive module can be individually packaged, and a location relationship between the two may be flexibly arranged, the decorative part may be used to decorate the receive module and the one or more camera modules, and no longer surround the transmit module, so that the decorative part, the receive module, the one or more camera modules, and the transmit module are arranged in more diversified manners.

Because a part of the decorative part is exposed to the outside of the electronic device, and the receive module and the one or more camera modules that are decorated by the decorative part are similar, or even the same in appearance, the decorative part, the receive module, and the one or more camera modules may basically be symmetrically distributed on the electronic device, so that the electronic device is harmonious in appearance, and is more aesthetically appealing. The decorative part can also prevent problems such as reduced structural strength and easy deformation caused by an excessively large volume due to an excessively large quantity of devices that need to be surrounded.

In an implementation, the receive module and the one or more camera modules are arranged in a first direction, the receive module and the transmit module are arranged in a second direction, and the second direction is the same as the first direction, or the second direction is perpendicular to the first direction. For example, the first direction and the second direction are width directions of the electronic device or length directions of the electronic device. Alternatively, one of the first direction and the second direction is a width direction of the electronic device, and the other is a length direction of the electronic device.

In this embodiment, the receive module, the one or more camera modules, and the transmit module are arranged in a plurality of manners, so that the electronic device can be designed in different appearance forms with high flexibility.

An extension direction (that is, a cable outgoing direction of the receive module) of the connection end of the receive module may be flexibly set based on a location of the transmit module and locations of elements on the circuit board. For example, the extension direction of the connection end of the receive module may be perpendicular to the second direction. In this case, the connection end of the receive module and the transmit module are fixed on a same surface of the circuit board. Alternatively, the extension direction of the connection end of the receive module may be the same as the second direction. In this case, the connection end of the receive module and the transmit module may be fixed on two surfaces of the circuit board that face away from each other. Extension directions of the connection ends of the one or more camera modules may be the same as, or different from the extension direction of the connection end of the receive module. This is not strictly limited in this application.

In an implementation, a spacing between a receiving axis of the receive module and a transmitting axis of the transmit module is within a range of 0.5 mm to 30 mm. In this case, the receiving axis and the transmitting axis are close to each other to the greatest extent, to ensure that the coverage between the transmitting field of view and the receiving field of view is relatively high, so that operation performance of the time-of-flight module is relatively good.

In an implementation, the time-of-flight module further includes a drive chip. The drive chip is fixed to a side that is of the circuit board and that faces away from the transmit module. A projection of the drive chip on the circuit board partially or completely overlaps a projection part of the transmit module on the circuit board. That the projection of the drive chip on the circuit board completely overlaps the projection of the transmit module on the circuit board means that one completely falls within the range of the other.

In this embodiment, because the projection of the drive chip on the circuit board partially or completely overlaps the projection part of the transmit module on the circuit board, the drive chip and the transmit module are respectively fixed, in an approximately opposite manner, to two sides of the circuit board that face away from each other, so that cabling between the drive chip and the transmit module is relatively short, and parasitic inductance is relatively small, thereby ensuring that pulse waveform quality of the detection optical signal emitted by the transmit module is relatively good, to increase a signal-to-noise ratio.

Optionally, the time-of-flight module further includes a plurality of matching electronic elements. The plurality of matching electronic elements include, but are not limited to a capacitor, an inductor, a resistor, and the like. The plurality of matching electronic elements may reduce parasitic inductance between the drive chip and the transmit module, to ensure waveform integrity of the detection optical signal emitted by the transmit module. The plurality of matching electronic elements are fixed to a side that is of the circuit board and that faces away from the transmit module. The plurality of matching electronic elements are arranged around the drive chip. A projection of the plurality of matching electronic elements on the circuit board may partially or completely overlap the projection part of the transmit module on the circuit board.

In an implementation, the transmit module includes a holder, a transmitter, and a diffuser. The holder has a top surface and a bottom surface that are disposed opposite to each other. The bottom surface of the holder faces the circuit board. The holder forms a transmission cavity. The transmission cavity is located inside the holder. The holder further has a positioning groove. The positioning groove is recessed from the top surface of the holder to a direction that is close to the bottom surface of the holder. The positioning groove is in communication with the transmission cavity. The transmitter is configured to emit the detection optical signal. The transmitter is received in the transmission cavity and fixed to the holder. The transmitter may be a vertical cavity surface emitting laser. In this case, there is no need to add a collimator lens to the inside of the transmit module, so that costs of manufacturing the transmit module are lower, and manufacturing technology difficulty is lower. The diffuser is fixed to the holder and covers the transmission cavity. The diffuser is located in the positioning groove. The diffuser is configured to increase an angle of view of the detection optical signal.

In this embodiment, an angle of view of the transmitting field of view of the transmitter may be within the range from 15° to 25°. For example, the angle of view of the transmitting field of view of the transmitter may be designed as 21°±3°. The transmit module may enlarge the angle of view of the transmitting field of view of the transmitter by using the diffuser, so that the transmitting field of view of the transmit module has a relatively large angle of view. In other words, the diffuser can diffuse a laser beam having a small angle to an angle of view required by the time-of-flight module. Because the transmit module has a relatively large angle of view, a problem that the coverage between the transmitting field of view and the receiving field of view is decreased due to a relatively long spacing between the transmitting axis of the transmit module and the receiving axis of the receive module can be avoided, so that the spacing between the transmitting axis of the transmit module and the receiving axis of the receive module may be greater than that of the conventional time-of-flight module, thereby further improving arrangement flexibility of the transmit module and the receive module.

In an implementation, the holder is made of an aluminum nitride ceramic material. Because heat conductivity of the aluminum nitride ceramic material is better than that of another ceramic material, and a difference between a coefficient of thermal expansion (coefficient of thermal expansion, CTE) of the holder and that of the transmitter is smaller, the CTE of the holder may still well match that of the transmitter and maintain good strength even if the transmitter is repeatedly heated, to ensure operation reliability of the time-of-flight module.

In an implementation, the transmit module further includes adhesive glue. The adhesive glue is connected between the holder and the diffuser. The adhesive glue is provided with one or more air vents. The one or more air vents are in communication with the transmission cavity to the outside of the transmit module. Because when welded to the circuit board, the transmit module needs to withstand baking al a high temperature of approximately 260° C., the one or more air vents can enable air that expands upon heating in the transmission cavity to flow to the outside of the transmit module, to avoid a case in which a structure of the transmit module is destroyed because the air in the transmission cavity jacks up the diffuser in the welding process.

According to a second aspect, an embodiment of this application provides an electronic device, including a controller and the foregoing camera assembly. The controller is electrically connected to the circuit board. In this embodiment, the receive module, the transmit module, and the controller are all electrically connected to the circuit board, so that signal transmission can be achieved through a circuit on the circuit board. The controller may obtain a distance between the to-be-measured object and the time-of-flight module through calculation of a difference between time or phases at which the time-of-flight module emits the detection optical signal and receives the induction optical signal. In this application, the time-of-flight module can be applied to ranging, facial recognition, profile unlock, gesture recognition, modeling of objects, 3D games, smart household or another environment.

DESCRIPTION OF EMBODIMENTS

The following describes implementations of this application with reference to the accompanying drawings in the implementations of this application.

Figure 1:
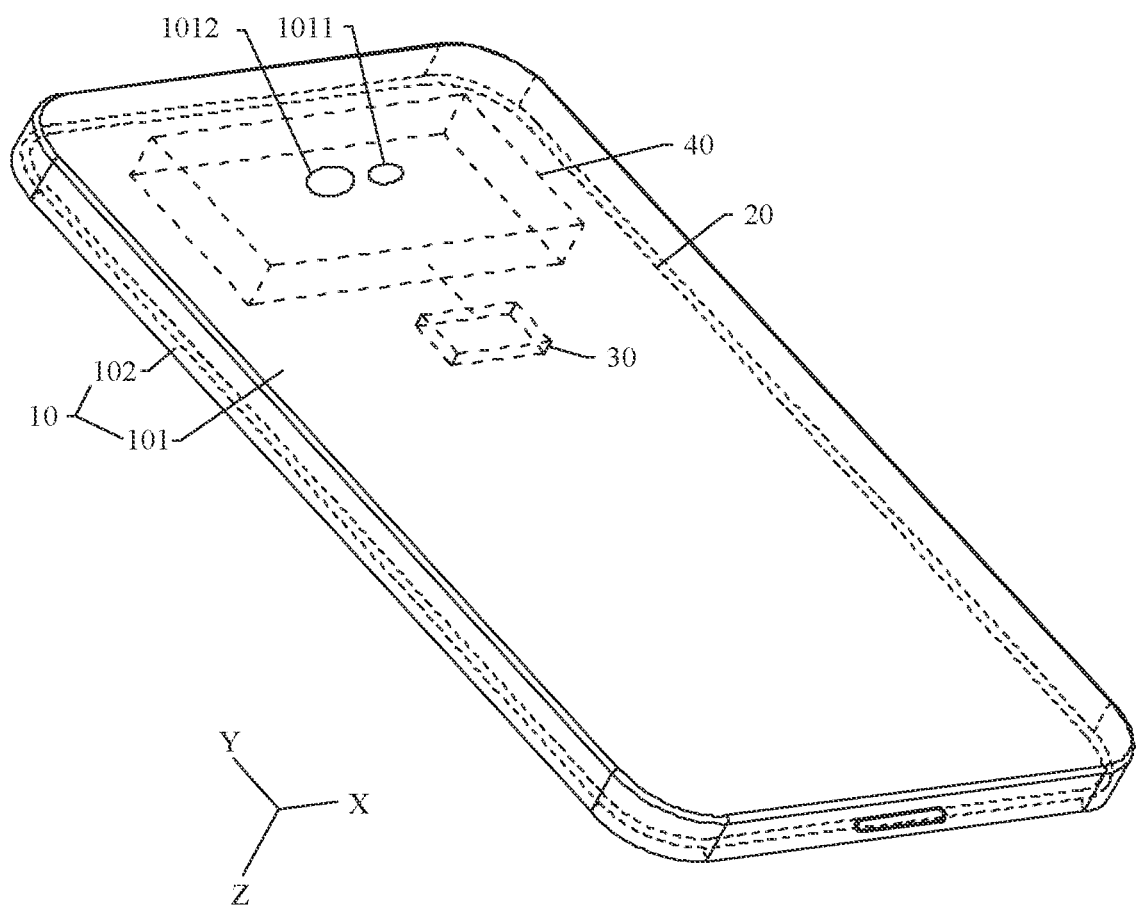
FIG. 1 is a schematic structural diagram of an electronic device in a first embodiment according to an embodiment of this application.

Refer to FIG. 1, FIG. 1 is a schematic structural diagram of an electronic device 100 in a first embodiment according to an embodiment of this application. The electronic device 100 in this application may be a mobile phone, a tablet computer, an e-reader, a notebook computer, an in-vehicle device, a wearable device, or the like. The embodiment is described by using an example in which the electronic device 100 is a mobile phone. A width direction of the electronic device 100 is defined as X, a length direction of the electronic device 100 is defined as Y, and a thickness direction of the electronic device 100 is defined as Z. The width direction X, the length direction Y, and the thickness direction Z are perpendicular to each other.

The electronic device 100 includes a housing 10 and a display 20. The housing 10 may include a back cover 101 and a bezel 102. The bezel 102 is connected to a periphery of the back cover 101. The bezel 102 and the back cover 101 may be integrally formed, or may form an integrated structure by assembly. The display 20 is mounted on a side that is of the bezel 102 and that faces away from the back cover 101. The display 20 integrates a display function with a touch function. The display 20 includes a display panel and a front cover that covers the display panel. The display panel may be a liquid crystal display panel (Liquid Crystal Display, LCD), an organic light-emitting diode (organic light-emitting diode, OLED) display panel, or a micro light-emitting diode (micro light-emitting diode, micro LED) display panel. The front cover may be a cover glass (cover glass, CG).

The electronic device 100 further includes a controller 30 and a camera assembly 40. The controller 30 is received inside the housing 10. The camera assembly 40 is mounted in the housing 10. All of the camera assembly 40 is received inside the housing 10, or most of the camera assembly 40 is received inside the housing 10. The camera assembly 40 is configured to acquire an image to form a corresponding image signal. The controller 30 is electrically connected to the camera assembly 40, and the controller 30 is configured to process the image signal of the camera assembly 40. The controller 30 may be a main chip on a mainboard of the electronic device 100.

In an environment in which the electronic device 100 is used, the front cover is defined to face front of the electronic device 100, and the back cover 101 is defined to face rear of the electronic device 100. In this embodiment, the camera assembly 40 can acquire an image at the rear of the electronic device 100. In another embodiment, the camera assembly 40 can acquire an image in front of the electronic device 100.

Figure 2:
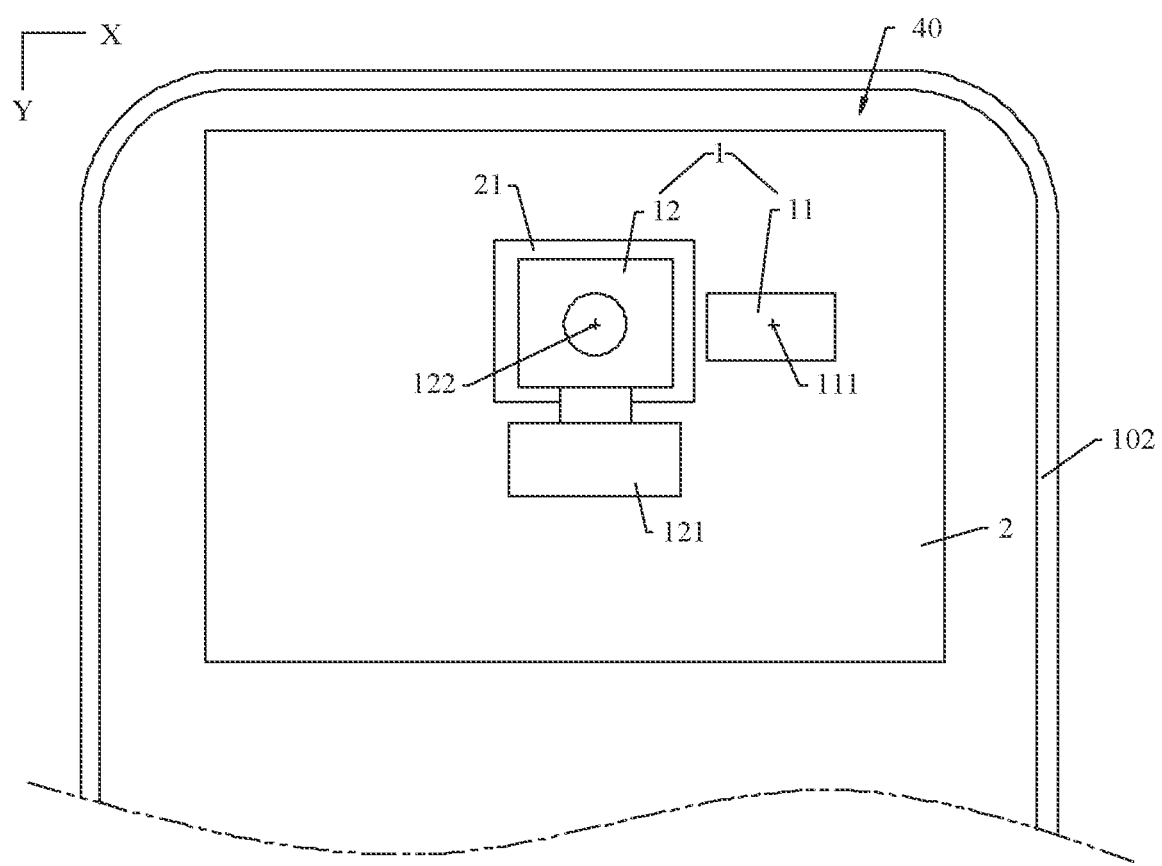
FIG. 2 is a schematic diagram of a positional relationship between a camera assembly and a bezel of the electronic device shown in FIG. 1 in an implementation.
Figure 3:
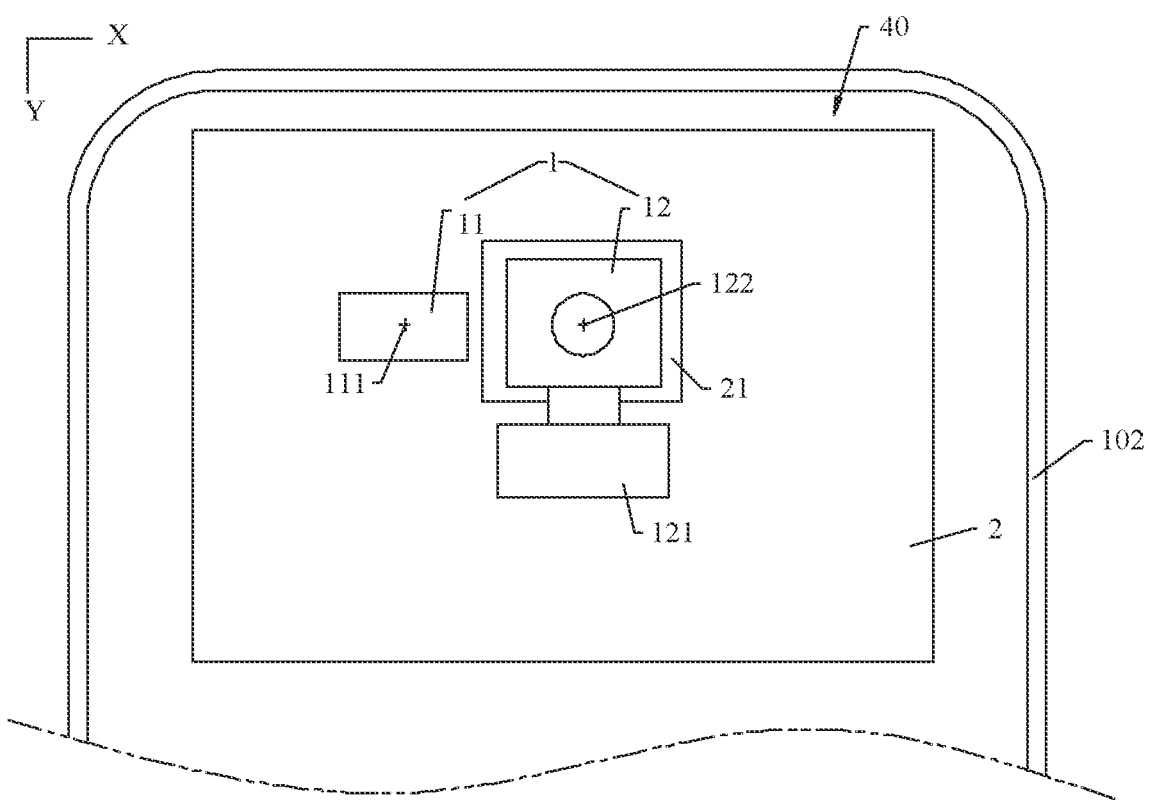
FIG. 3 is a schematic diagram of a positional relationship between a camera assembly and a bezel of the electronic device shown in FIG. 1 in another implementation.
Figure 4:
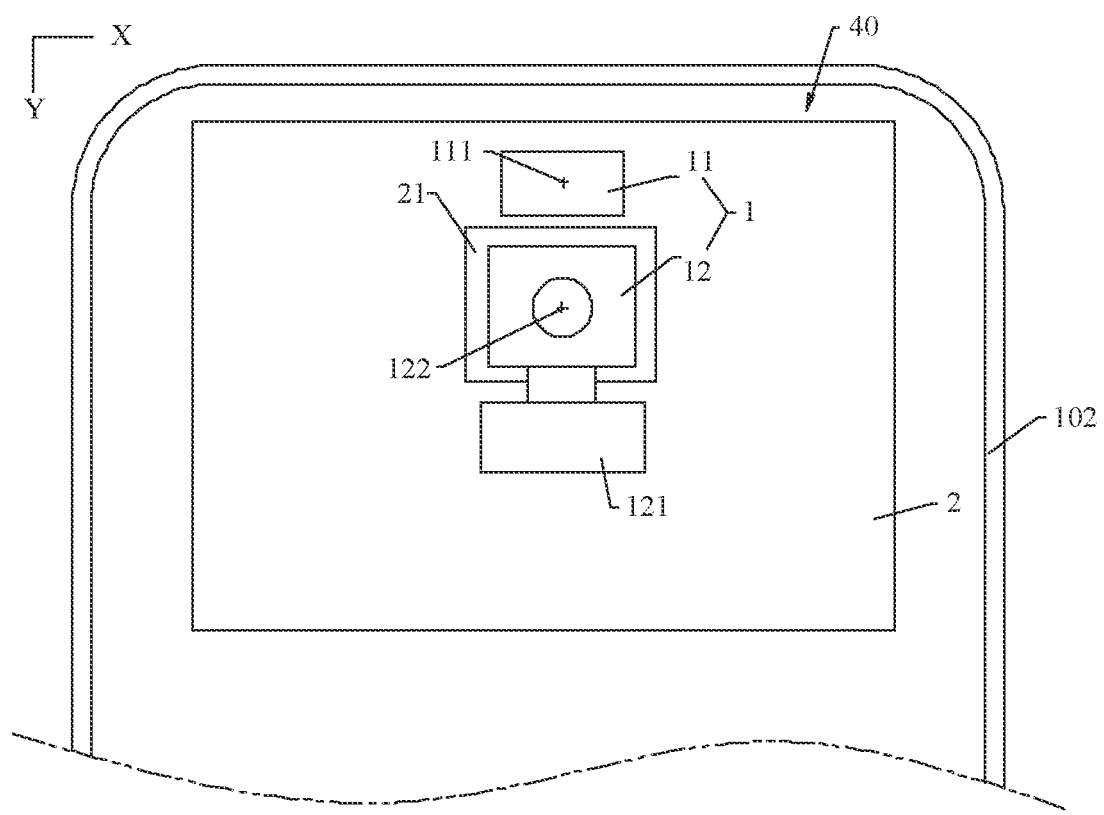
FIG. 4 is a schematic diagram of a positional relationship between a camera assembly and a bezel of the electronic device shown in FIG. 1 in still another implementation.
Figure 5:
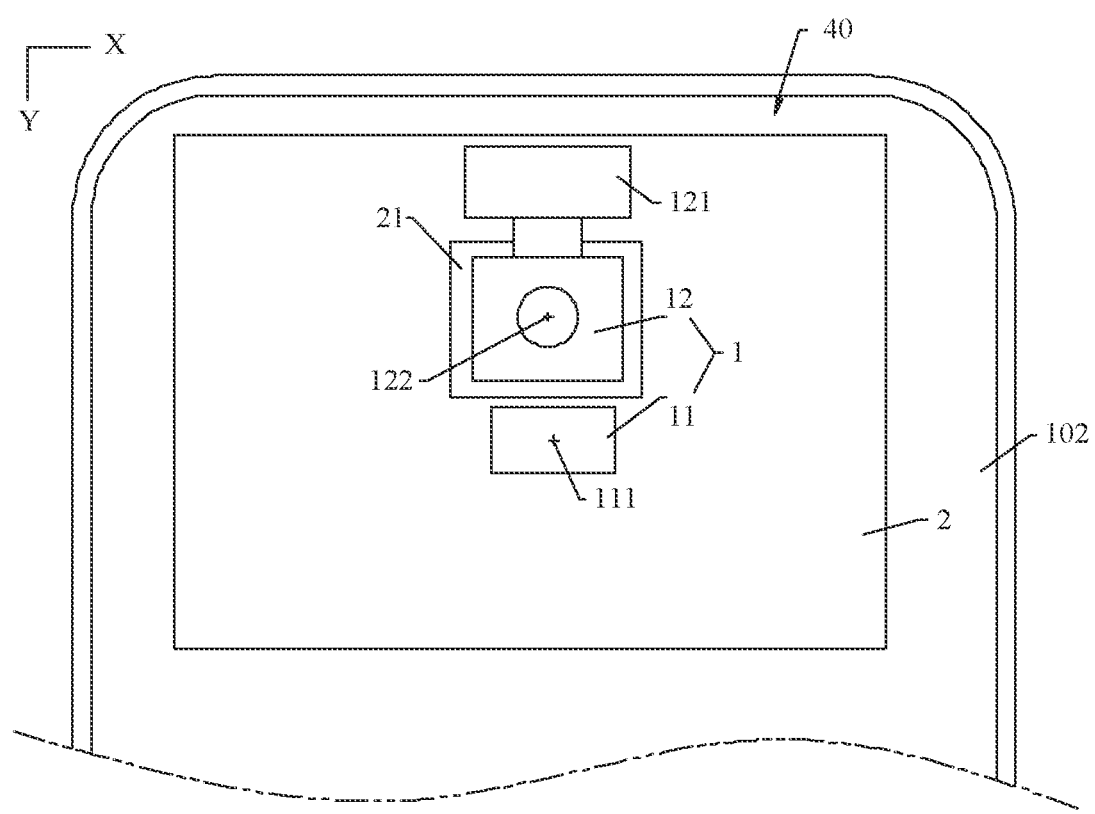
FIG. 5 is a schematic diagram of a positional relationship between a camera assembly and a bezel of the electronic device shown in FIG. 1 in yet another implementation.

Refer to FIG. 2 to FIG. 5, FIG. 2 is a schematic diagram of a positional relationship between the camera assembly 40 and the bezel 102 of the electronic device 100 shown in FIG. 1 in an implementation; FIG. 3 is a schematic diagram of a positional relationship between the camera assembly 40 and the bezel 102 of the electronic device 100 shown in FIG. 1. In another implementation; FIG. 4 is a schematic diagram of a positional relationship between the camera assembly 40 and the bezel 102 of the electronic device 100 shown in FIG. 1 in still another implementation; and FIG. 5 is a schematic diagram of a positional relationship between the camera assembly 40 and the bezel 102 of the electronic device 100 shown in FIG. 1 in yet another implementation.

The camera assembly 40 includes a time-of-flight (time of flight, TOF) module 1 and a circuit board 2. The circuit board 2 is provided with an avoidance space 21. The circuit board 2 may be a mainboard of the electronic device 100, or a part of a mainboard of the electronic device 100. The circuit board 2 may be a rigid printed circuit board, or a combined rigid/flex printed circuit board. The time-of-flight module 1 includes a transmit module 11 and a receive module 12. The transmit module 11 is configured to emit a detection optical signal. The detection optical signal may be infrared light. The receive module 12 is configured to receive an induction optical signal formed after the detection optical signal is reflected by a to-be-measured object. The induction optical signal carries depth of field information of the to-be-measured object. The receive module 12 may be a camera module. The receive module 12 and the transmit module 11 are individually packaged. The receive module 12 is located in the avoidance space 21, and a connection end 121 of the receive module 12 is fixed to the circuit board 2. The receive module 12 is electrically connected to the circuit board 2 via the connection end 121. The transmit module 11 is located around the receive module 12 and fixed to the circuit board 2.

The receive module 12, the transmit module 11, and the controller 30 are all electrically connected to the circuit board 2, so that signal transmission can be implemented through a circuit on the circuit board 2. The controller 30 may obtain a distance between the to-be-measured object and the time-of-flight module 1 through calculation of a difference between time or phases at Which the time-of-flight module 1 emits the detection optical signal and receives the induction optical signal. For example, a digital signal processing (digital signal processing, DSP) module in the controller 30 may process data output by the time-of-flight module 1, to output a finally required depth picture. In this application, the time-of-flight module 1 can be applied to ranging, facial recognition, profile unlock, gesture recognition, modeling of objects, 3D games, smart household or another environment.

In this embodiment, the receive module 12 and the transmit module 11 are individually packaged. The receive module 12 has a receiving field of view (not shown in the figure) and a receiving axis 122, and the receiving axis 122 is a central axis of the receiving field of view. The transmit module 11 has a transmitting field of view (not shown in the figure) and a transmitting axis 111, and the transmitting axis 111 is a central axis of the transmitting field of view. Optionally, a spacing between a receiving axis 122 of the receive module 12 and a transmitting axis 111 of the transmit module 11 is within a range of 0.5 mm (mm) to 30 mm. The receiving axis 122 and the transmitting axis 111 are close to each other to the greatest extent, to ensure that the coverage between the transmitting field of view and the receiving field of view is relatively high, so that operation performance of the time-of-flight module 1 is relatively good.

In this embodiment, because the receive module 12 is located in the avoidance space 21, and the connection end 121 of the receive module 12 is fixed to the circuit board 2, the receive module 12 and the transmit module 11 can be close to each other, so that a spacing between the receiving axis 122 and the transmitting axis 111 is sufficiently small, to meet a performance requirement of the time-of-flight module 1. In addition, the receive module 12 and the transmit module 11 are individually packaged, and there is no direct mounting or direct connection relationship between the receive module 12 and the transmit module 11. Therefore, the transmit module 11 and the receive module 12 are arranged in a more flexible manner, and a plurality of arrangement structures may be formed. The examples are shown in the following.

As shown in FIG. 2, the transmitting axis ill of the transmit module 11 and the receiving axis 122 of the receive module 12 are arranged in a width direction X of the electronic device 100. The transmit module 11 is located on a right side of the receive module 12. As shown in FIG. 3, the transmitting axis 111 of the transmit module 11 and the receiving axis 122 of the receive module 12 are arranged in the width direction X of the electronic device 100. The transmit module 11 is located on the left side of the receive module 12. As shown in FIG. 4, the transmitting axis 111 of the transmit module 11 and the receiving axis 122 of the receive module 12 are arranged in a length direction Y of the electronic device 100. The transmit module 11 is located on a top side of the receive module 12. As shown in FIG. 5, the transmitting axis 111 of the transmit module 11 and the receiving axis 122 of the receive module 12 are arranged in the length direction Y of the electronic device 100. The transmit module 11 is located on a bottom side of the receive module 12.

Referring to FIG. 1, in the implementations shown in FIG. 2 to FIG. 3, a transmitting area 1011 corresponding to the transmit module 11 and a receiving area 1012 corresponding to the receive module 12 are provided on the back cover 101. Because the transmit module 11 and the receive module 12 are arranged in a plurality of manners, correspondingly, the transmitting area 1011 and the receiving area 1012 are arranged in a plurality of manners, so that the electronic device 100 to which the camera assembly 40 is applied can have a plurality of appearance (also referred to as industrial design, Industrial Design, ID) forms. In other words, the camera assembly 40 can be applied to a plurality of electronic devices that have different appearance forms. The camera assembly 40 is widely applicable. Because electronic devices that have a plurality of different appearance forms can use a same camera assembly 40, there is no need to repeatedly develop time-of-flight modules 1 in different forms based on different appearance forms, thereby reducing developing costs and manufacturing costs of electronic devices.

It may be understood that, currently, a structured light module is used as a depth camera module on some electronic devices. The structured light module includes a transmit end and a receive end. Based on detection principles of the structured light module, a center distance between the transmit end and the receive end needs to be at least greater than 25 mm, to ensure normal operation of the structured light module. Because detection precision of the distance by the structured light module mainly depends on brightness of flares, precision is relatively high when the structured light module performs depth ranging at a short distance. For example, when a distance from an object is approximately 40 cm, precision may reach within 1%. However, precision may be significantly reduced for long distance application. Therefore, the structured light module can only be configured to detect a to-be-measured object (for example, face of a user) that is relatively close to the electronic device and in front of the electronic device, and during the depth ranging, the distance does not exceed 1 m. In this application, a range of a detection distance of the time-of-flight module 1 is far greater than that of a detection distance of the structured light module, so that the time-of-flight module 1 may not only be configured to detect a to-be-measured object at a short distance, but also to detect a to-be-measured object at a long distance. In an embodiment, the time-of-flight module 1 is configured to detect a to-be-measured object at a short distance or a to-be-measured object at a long distance that is at the rear of the electronic device 100. In this case, the electronic device 100 may also include a structured light module, configured to detect a to-be-measured object at a short distance that is in front of the electronic device 100. In another embodiment, the time-of-flight module 1 is configured to detect a to-be-measured object at a short distance or a to-be-measured object at a long distance that is in front of the electronic device 100. In this case, the electronic device 100 is no longer provided with a structured light module.

Optionally, the avoidance space 21 may be a through hole or a groove disposed on the circuit board 2. The receive module 12 is located in the avoidance space 21, so that the receive module 12 can reuse a part or all of a thickness space of the circuit board 2, the camera assembly 40 is arranged more compact, and a size of the camera assembly 40 in a thickness direction Z of the electronic device 100 is smaller.

Figure 6:
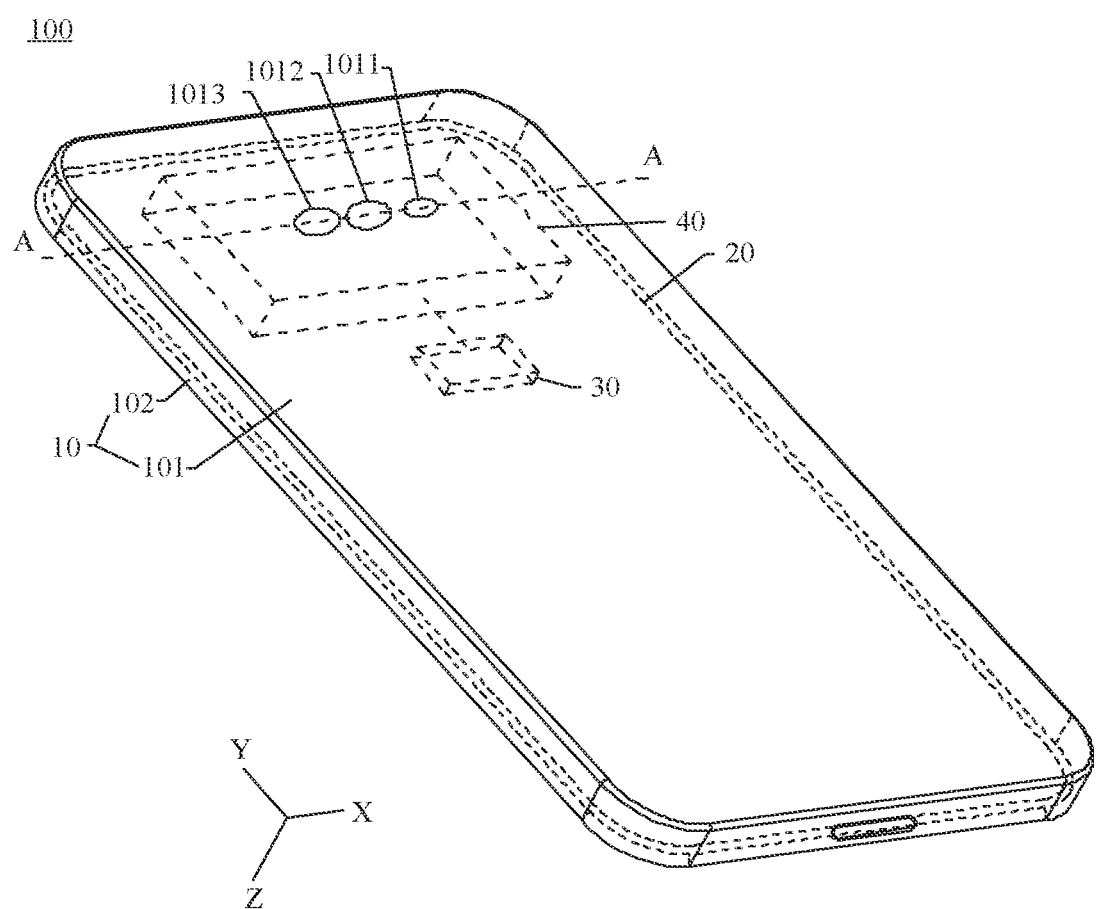
FIG. 6 is a schematic structural diagram of an electronic device in a second embodiment according to an embodiment of this application.
Figure 7:
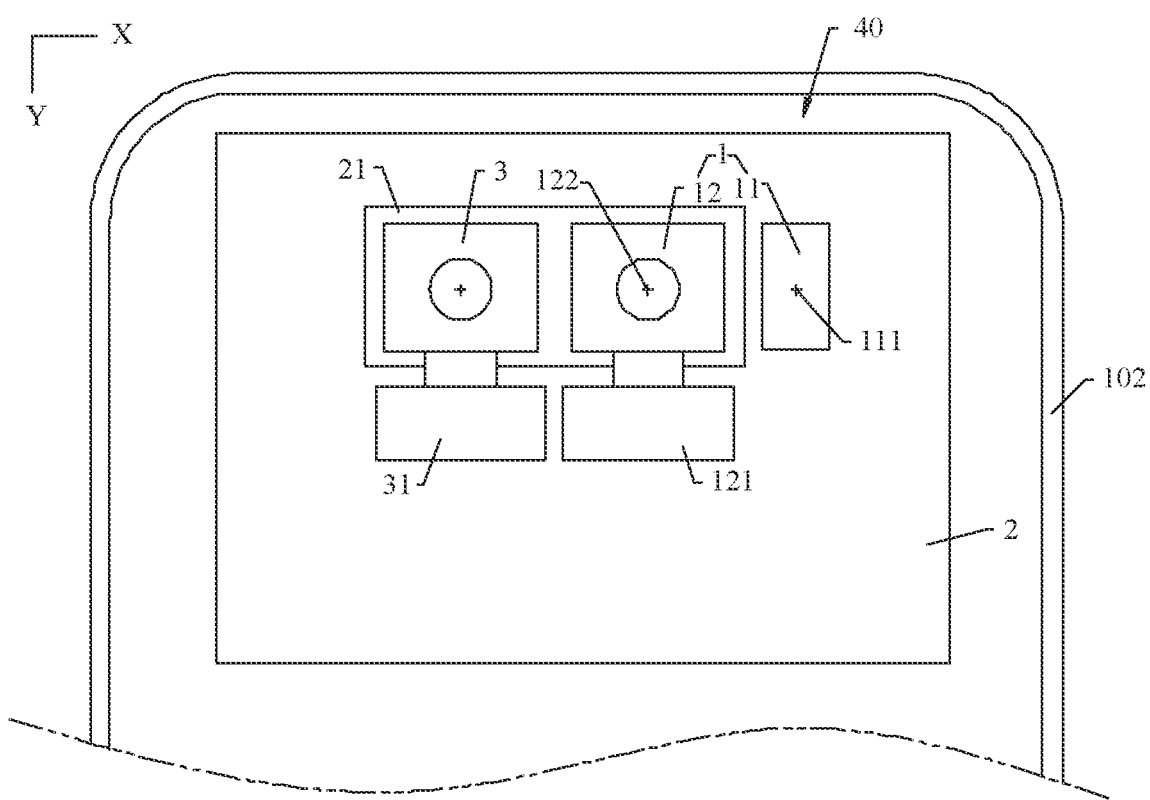
FIG. 7 is a schematic structural diagram of a camera module and a bezel of the electronic device show in FIG. 6 in an implementation.

Referring to FIG. 6 and FIG. 7, FIG. 6 is a schematic structural diagram of an electronic device 100 in a second embodiment according to an embodiment of this application; and FIG. 7 is a schematic structural diagram of a camera module 3 and a bezel 102 of the electronic device 100 shown in FIG. 6 in an implementation. Some technical content that is in this embodiment and that is the same as that in the first embodiment is not described again. Specific details of the structure of the camera assembly 40 in this application are mainly described in the second embodiment. Technical solutions and related technical features in the second embodiment may be combined with the first embodiment when there is no conflict.

The camera assembly 40 further includes one or more camera modules 3. The camera module 3 may be a color lens (also referred to as an RGB lens), a black and white lens, a wide-angle lens, or a zoom lens. The one or more camera modules 3 are located in the avoidance space 21, and connection ends 31 of the one or more camera modules 3 are fixed to the circuit board 2. The one or more camera modules 3 may collaboratively operate with the time-of-flight module 1. For example, when an image captured by the time-of-flight module 1 is combined with an image captured by the color lens, a three-dimensional profile of the to-be-measured object may be presented in a graphic manner in which different colors represent different distances. The accompanying drawing of this application is depicted by using an example in which the camera assembly 40 includes one camera module 3.

In this embodiment, the one or more camera modules 3 may be placed in parallel with the receive module 12. Optionally, the receive module 12 and the one or more camera modules 3 are arranged in a first direction. The receive module 12 and the transmit module 11 are arranged in a second direction. The second direction is the same as the first direction. For example, the first direction and the second direction are width directions X of the electronic device 100 or length directions Y of the electronic device 100. As shown in FIG. 7, the first direction is the width direction X of the electronic device 100, and the second direction is also the width direction X of the electronic device 100. In another embodiment, the second direction may be perpendicular to the first direction. For example, one of the first direction and the second direction is the width direction X of the electronic device 100, and the other is the length direction Y of the electronic device 100.

In another embodiment, the one or more camera modules 3 and the receive module 12 may be arranged in another manner, for example, arranged in a matrix, a triangle, a quadrangle, a circle, or the like.

Optionally, an extension direction (that is, a cable outgoing direction of the receive module 12, and also a direction from a light sensitive chip to a connector of the receive module 12) of the connection end 121 of the receive module 12 may be flexibly set based on a location of the transmit module 11 and locations of elements on the circuit board 2. For example, the extension direction of the connection end 121 of the receive module 12 may be perpendicular to the second direction. In this case, the connection end 121 of the receive module 12 and the transmit module 11 are fixed on a same surface of the circuit board 2. Alternatively, the extension direction of the connection end 121 of the receive module 12 may be the same as the second direction. In this case, the connection end 121 of the receive module 12 and the transmit module 11 may be fixed on two surfaces of the circuit board 2 that face away from each other. Extension directions of the connection ends of the one or more camera modules 3 may be the same as, or different from the extension direction of the connection end 121 of the receive module 12. This is not strictly limited in this application.

Optionally, a collection area 1013 corresponding to the one or more camera modules 3 is further provided on the back cover 101. In this embodiment, because the receive module 12 and the transmit module 11 are individually packaged, the receive module 12, the transmit module 11, and the camera module 3 are arranged in a plurality of manners, and correspondingly, the transmitting area 1011, the receiving area 1012, and the collection area 1013 that are on the back cover 101 are also arranged in a plurality of manners, so that the electronic device 100 to which the camera assembly 40 is applied may have a plurality of appearance forms. In other words, the camera assembly 40 can be applied to a plurality of electronic devices that have different appearance forms. The camera assembly 40 is widely applicable.

Figure 8:
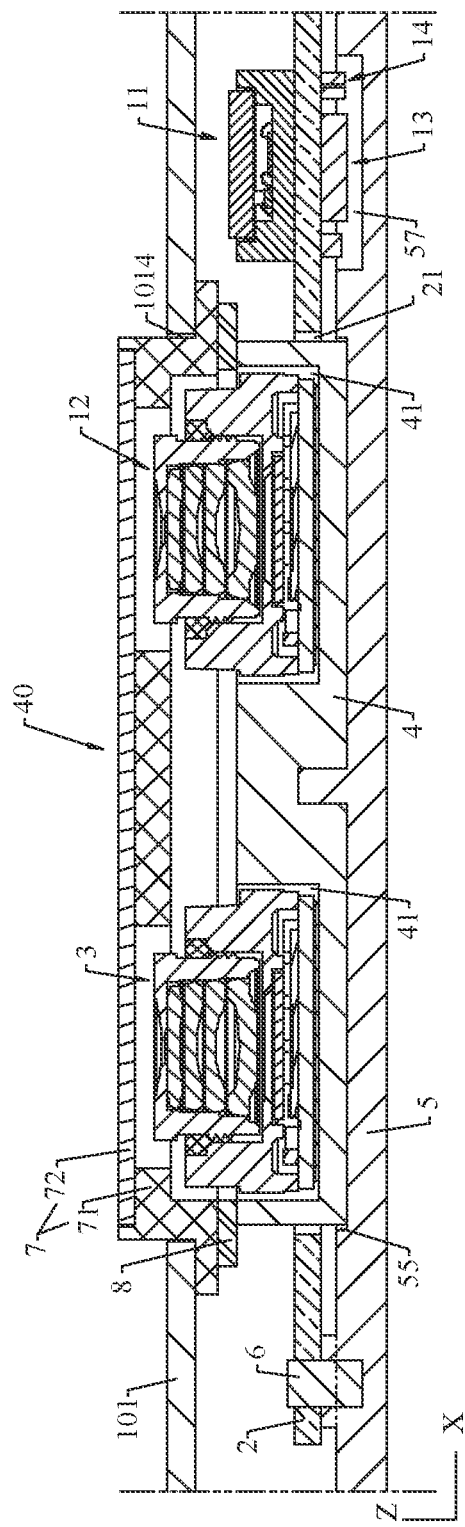
FIG. 8 is a cross-sectional view of a part of a structure of the electronic device shown in FIG. 6 taken along a line A-A in an implementation.
Figure 9:
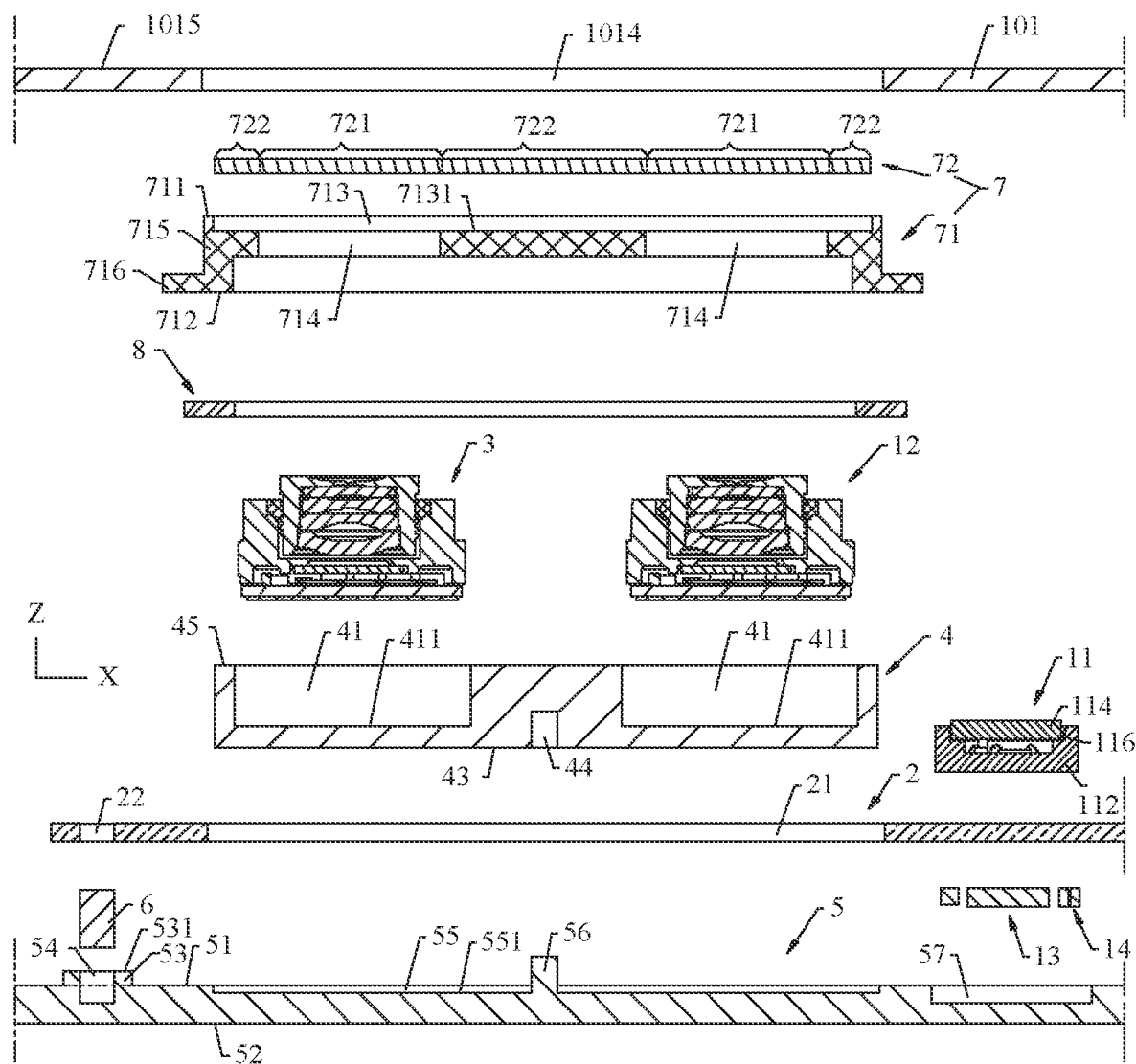
FIG. 9 is a schematic exploded view of a part of the structure shown in FIG. 8.
Figure 10:
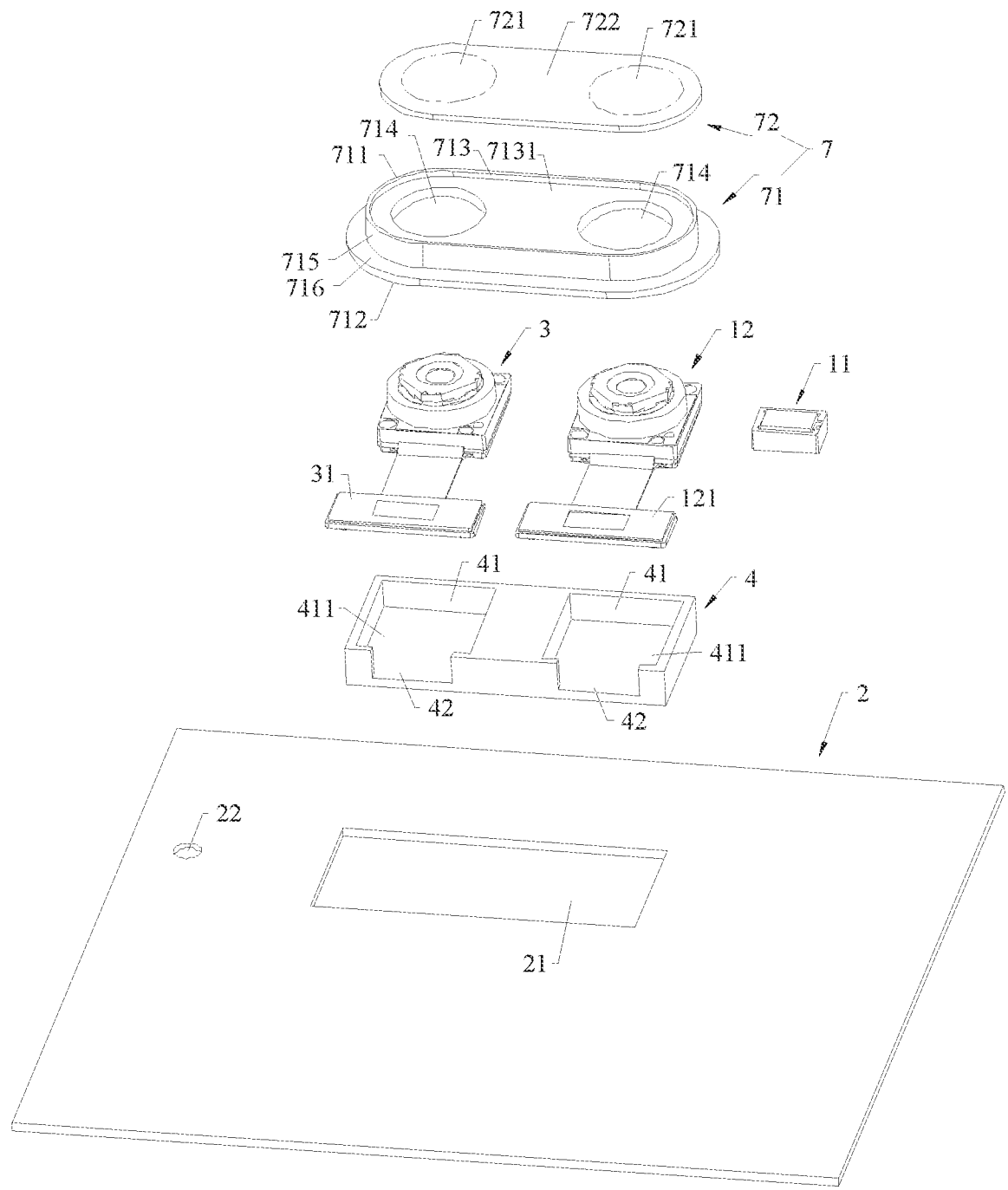
FIG. 10 is a schematic exploded view of a part of a structure of a camera assembly of the electronic device shown in FIG. 6.

Referring to FIG. 8 to FIG. 10. FIG. 8 is a cross-sectional view of a part of a structure of the electronic device 100 shown in FIG. 6 taken along a line A-A in an implementation; FIG. 9 is a schematic exploded view of a part of the structure shown in FIG. 8; and FIG. 10 is a schematic exploded view of a part of a structure of a camera assembly 40 of the electronic device 100 shown in FIG. 6. The implementation shown in FIG. 8 corresponds to the implementation shown in FIG. 7.

Optionally, the camera assembly 40 further includes a camera bracket 4 located in the avoidance space 21. The camera bracket 4 has a plurality of receiving grooves 41 spaced apart from each other. Opening directions of the plurality of receiving grooves 41 are the same. The receive module 12 and the one or more camera modules 3 are received in the plurality of receiving grooves 41 in a one-to-one correspondence manner. The receive module 12 and the one or more camera modules 3 are spaced apart from each other, to avoid collision and damage due to accidental impact.

In this embodiment, the receive module 12 and the one or more camera modules 3 are received in the plurality of receiving grooves 41 of the camera assembly 40, and are fixed opposite to the camera bracket 4. The camera bracket 4 is located in the avoidance space 21, so that the receive module 12 and the one or more camera modules 3 are located in the avoidance space 21. The receive module 12, the one or more camera modules 3, and the camera bracket 4 may achieve modularization through a separate assembly process before an overall assembly process of the camera assembly 40 is performed, thereby simplifying steps of the overall assembly process of the camera assembly 40, and reducing assembly difficulty.

The receive module 12 and the one or more camera modules 3 may be adhered to bottom walls 411 of the plurality of receiving grooves 41 through an adhesive member, to be fixed opposite to the camera bracket 4. The camera bracket 4 may be made of a material with high thermal conductivity, for example, copper, aluminum foil, stainless steel, or another metal material. The adhesive member may be doped with thermally conductive particles (for example, graphite particles or metal particles) or made of a thermally conductive adhesive material.

In this embodiment, heat emitted by the receive module 12 and the one or more camera modules 3 can be conducted to the camera bracket 4 through the adhesive member, and heat dissipation is performed by using the camera bracket 4, to ensure reliability of operation of the camera assembly 40.

The camera bracket 4 further has a plurality of connection notches 42. The plurality of connection notches 42 are in communication with the plurality of receiving grooves 41 to the outside of the camera bracket 4 in a one-to-one correspondence manner. The connection end 121 of the receive module 12 and the connection ends 31 of the one or more camera modules 3 extend out of the plurality of receiving grooves 41 via the plurality of connection notches 42 in a one-to-one correspondence manner, to be fixed to the circuit board 2.

Optionally, the camera assembly 40 further includes a fixing bracket 5. The fixing bracket 5 may be used as a middle board of the electronic device 100, or may be a part of a middle board of the electronic device 100. The fixing bracket 5 is fixed opposite to a bezel 102 of the electronic device 100 (referring to FIG. 6). The fixing bracket 5 and the bezel 102 may be integrally formed, or may form an integrated structure with the bezel 102 in an assembly manner.

The circuit board 2 is fixed to the fixing bracket 5. The circuit board 2 may be fixed to the fixing bracket 5 through a fastener 6. For example, the fixing bracket 5 includes a first surface 51 and a second surface 52 that are disposed opposite to each other. The fixing bracket 5 has a mounting boss 53 and a mounting hole 54. The mounting boss 53 protrudes from the first surface 51. The mounting hole 54 is recessed from a top surface 531 that is of the mounting boss 53 and that is away from the first surface 51 to a direction that is close to the second surface 52. The circuit board 2 may abut against the top surface 531 of the mounting boss 53. A connection hole 22 corresponding to the mounting hole 54 is disposed on the circuit board 2. The fastener 6 runs through the connection hole 22 and extends into the mounting hole 54, so that the circuit board 2 is tightly fastened to the fixing bracket 5. The fastener 6, the structure of the connection hole 22, and the structure of the mounting hole 54 form a fastening structure. A plurality of groups of fastening structures between the circuit board 2 and the fixing bracket 5 may be formed. The plurality of groups of fastening structures may be scattered in a peripheral area of the circuit board 2, so that the circuit board 2 is more stably fixed to the fixing bracket 5.

The fixing bracket 5 has a mounting groove 55. The mounting groove 55 is recessed from the first surface 51 to a direction that is close to the second surface 52. The camera bracket 4 is fixed to the mounting groove 55. A bottom surface 43 that is of the camera bracket 4 and that faces away from the receiving groove 41 may abut against a bottom wall 551 of the mounting groove 55, to achieve mutual positioning between the two. A concave-convex matching structure may be disposed between the bottom wall 551 of the mounting groove 55 and the bottom surface 43 of the camera bracket 4. For example, a protruding convex block 56 may be disposed on the bottom wall 551 of the mounting groove 55. A concave groove 44 may be disposed on the bottom surface 43 of the camera bracket 4. The convex block 56 extends into the groove 44, so that the camera bracket 4 is fixed opposite to the fixing bracket 5. In another embodiment, a groove is disposed on the bottom wall 551 of the mounting groove 55, and a convex block is disposed on the bottom surface 43 of the camera bracket 4. The convex block extends into the groove, so that the camera bracket 4 is fixed opposite to the fixing bracket 5.

In this embodiment, because the circuit board 2 is fixed to the fixing bracket 5, and the camera bracket 4 is also fixed to the fixing bracket 5, mutual positioning between the circuit board 2 and the camera bracket 4 is achieved by using the fixing bracket 5, so that mutual positioning between the receive module 12 mounted on the camera bracket 4 and the transmit module 11 fixed to the circuit board 2 is achieved, and the relative location between the transmitting field of view and the receiving field of view is stable. In this case, the reliable operation of the time-of-flight module 1 can be ensured, and the performance of the camera assembly 40 is relatively good.

Optionally, the camera assembly 40 further includes a decorative part 7. The decorative part 7 is mounted on the back cover 101 (referring to FIG. 7). The decorative part 7 is located on one side that is of the receive module 12 and that receives the induction optical signal. The decorative part 7 includes a decorative ring 71 and a protection board 72. The decorative ring 71 has a top surface 711 and a bottom surface 712 that are disposed opposite to each other. A recessed limiting groove 713 is disposed on the top surface 711 of the decorative ring 71. The protection board 72 is mounted in the limiting groove 713 and abuts against a bottom wall 7131 of the limiting groove 713. The decorative part 7 is provided with a plurality of mounting spaces 714. The plurality of mounting spaces 714 are provided in the decorative ring 71. The mounting spaces 714 are in communication with the limiting groove 713 to a bottom surface 712 of the decorative ring 71. The protection board 72 may have a plurality of light-transmissive areas 721 that are spaced from each other and a light-shielding area 722 that is disposed surround the plurality of light-transmissive areas 721. The plurality of light-transmissive areas 721 are respectively disposed in the plurality of mounting spaces 714. In an embodiment, the protection board 72 is an integrated composite board, including translucent plates that form the plurality of light-transmissive areas 721 and a light-shielding plate that forms the light-shielding area 722. In another embodiment, the protection board 72 includes a glass substrate and a light-shielding coating that is located on the glass substrate and that faces the bottom wall 7131 of the limiting groove 713. A part that is of the light-shielding coating and that is located on the plurality of light-transmissive areas 721 is hollowly disposed. In still another embodiment, the protection board 72 is basically made of a transparent material. The bottom wall 7131 of the limiting groove 713 is provided with a plurality of gaps that are in communication with the mounting space 714, and the plurality of gaps correspond to the light-transmissive areas 721. A non-gap area on the bottom wall 7131 of the limiting groove 713 is made of a light-shielding material or is attached to a light-shielding layer, to correspond to the light-shielding area 722.

The receive module 12 and the one or more camera modules 3 are received in the plurality of mounting spaces 714. The receive module 12 and the one or more camera modules 3 are received in different mounting spaces 714 in a one-to-one correspondence manner. The receive module 12 and the one or more camera modules 3 collect light through a corresponding light-transmissive area 721. The transmit module 11 is located around the decorative part 7. In short, the receive module 12 and the one or more camera modules 3 are located inside the decorative part 7, and are surrounded by the decorative part 7, and the transmit module 11 is located outside the decorative part 7.

The receiving area 1012 and the collection area 1013 of the back cover 101 may be combined into one area 1014, and the area 1014 may be a through hole (marked with a number 1014 in the following). The decorative part 7 is mounted on the through hole 1014. The decorative ring 71 includes a main body part 715 and a limiting part 716. The plurality of mounting spaces 714 are disposed on the main body part 715. The limiting part 716 is connected to a periphery of the main body part 715. The decorative part 7 is mounted on the back cover 101. The limiting part 716 is located on one side that is of the back cover 101 and that faces the circuit board 2. The main body part 715 is located on the through hole 1014 and the main body part 715 protrudes from an outer surface 1015 that is of the back cover 101 and that faces away from the circuit board 2. In this case, the decorative part 7 can reuse a space that is of the back cover 101 and that is in the thickness direction Z of the electronic device 100, and the receive module 12 and the one or more camera modules 3 can also reuse the space that is of the back cover 101 and that is in the thickness direction Z of the electronic device 100, to help reduce a size of the electronic device 100 in the thickness direction Z, so that the electronic device 100 becomes thinner.

In this embodiment, because the transmit module 11 and the receive module 12 can be individually packaged, and a location relationship between the two may be flexibly arranged, the decorative part 7 may be used to decorate the receive module 12 and the one or more camera modules 3, and no longer surround the transmit module 11, so that the decorative part 7, the receive module 12, the one or more camera modules 3, and the transmit module 11 are arranged in more diversified manners.

Figure 11:
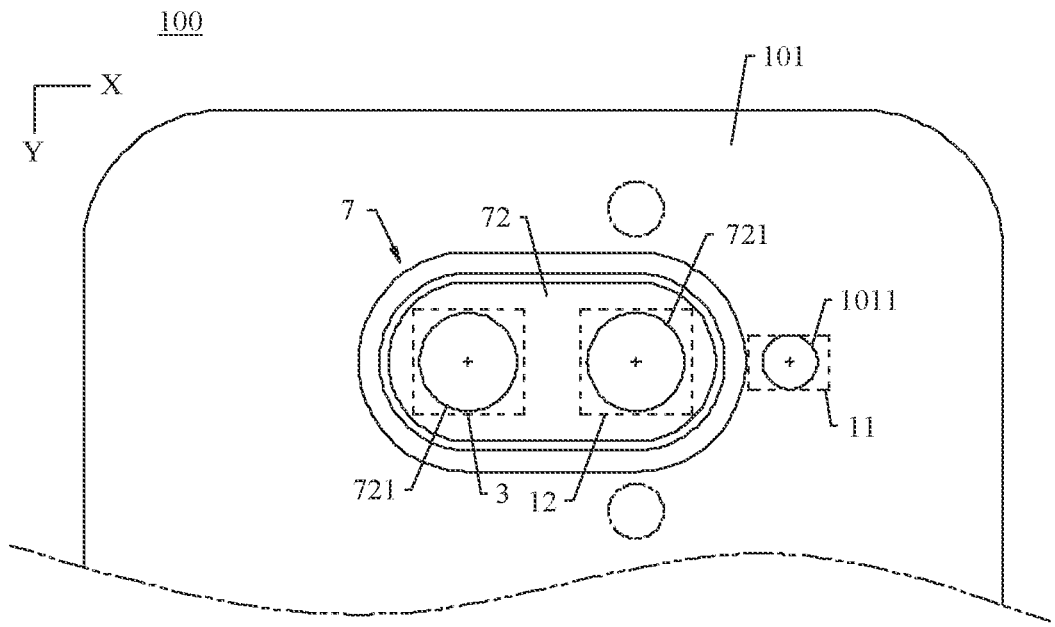
FIG. 11 is a rear view of the electronic device shown in FIG. 6 in an implementation.
Figure 12:
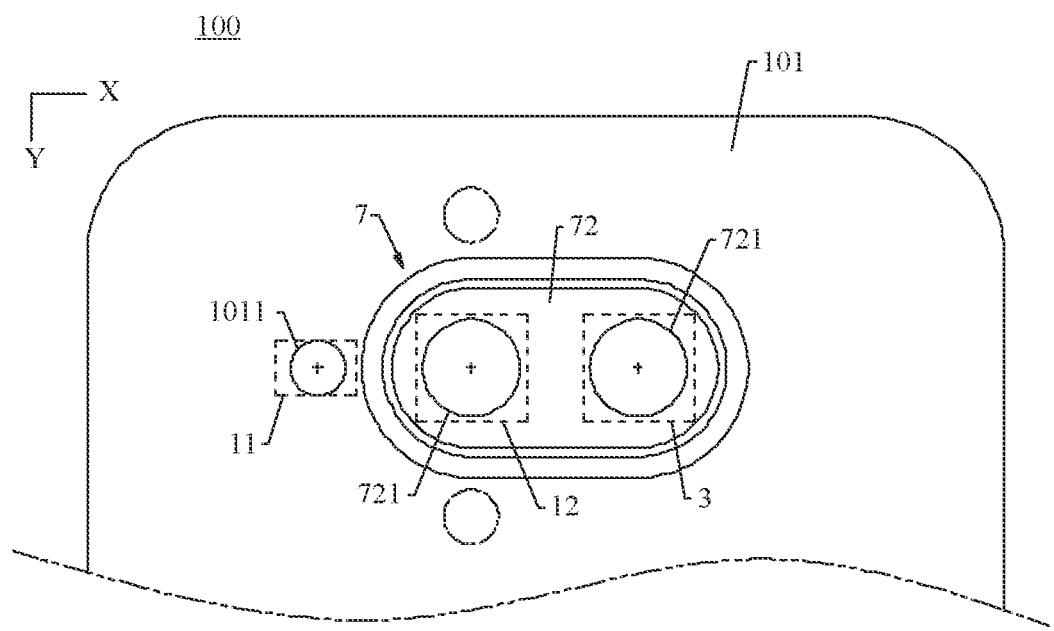
FIG. 12 is a rear view of the electronic device shown in FIG. 6 in another implementation.
Figure 13:
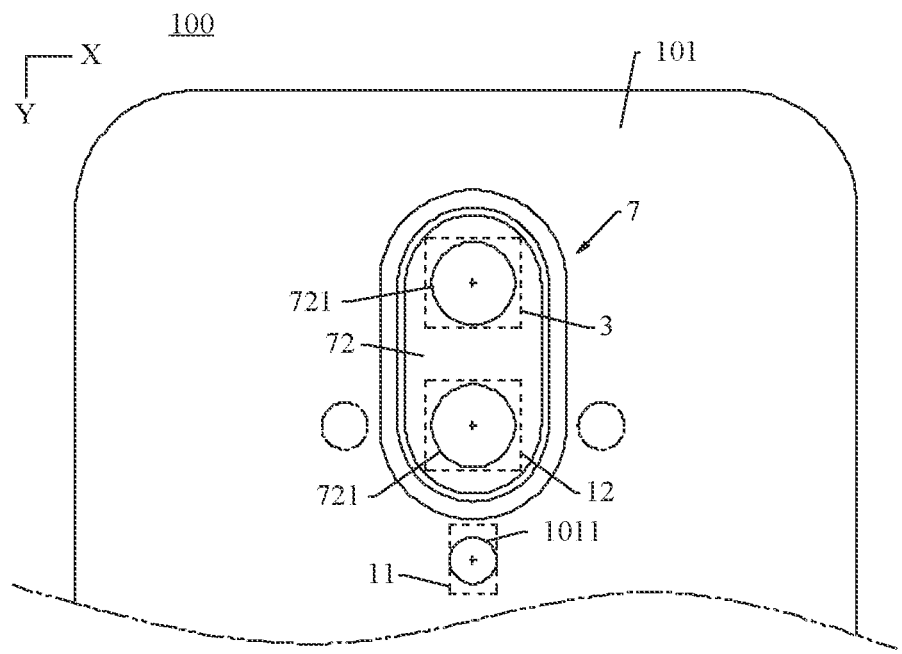
FIG. 13 is a rear view of the electronic device shown in FIG. 6 in still another implementation.
Figure 14:
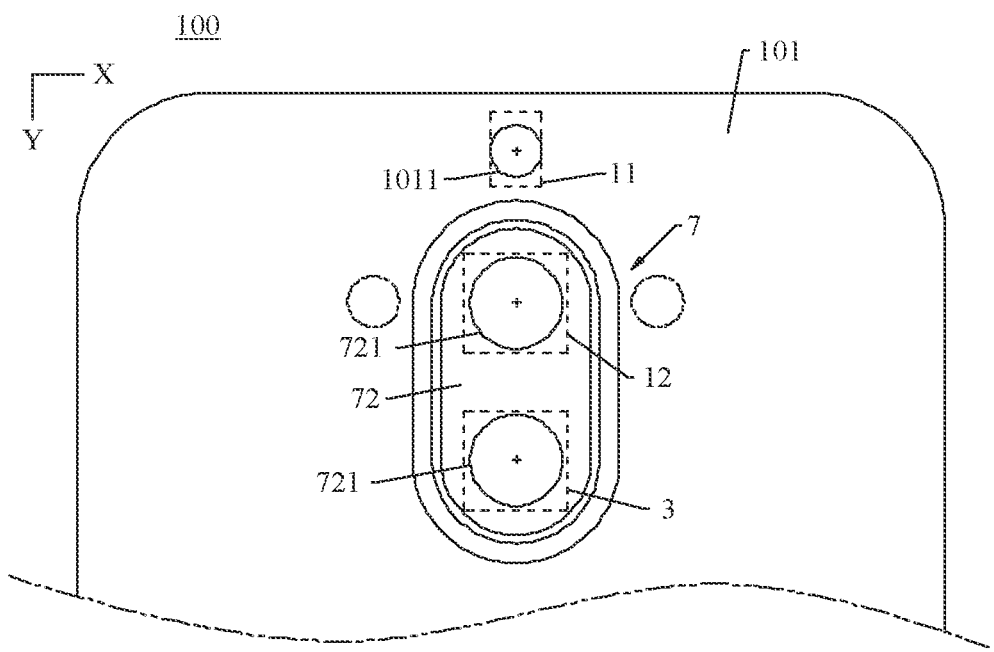
FIG. 14 is a rear view of the electronic device shown in FIG. 6 in yet another implementation.

For example:

referring to FIG. 11 to FIG. 14, FIG. 11 is a rear view of the electronic device 100 shown in FIG. 6 in an implementation; FIG. 12 is a rear view of the electronic device 100 shown in FIG. 6 in another implementation; FIG. 13 is a rear view of the electronic device 100 shown in FIG. 6 in still another implementation; and FIG. 14 is a rear view of the electronic device 100 shown in FIG. 6 in yet another implementation.

As shown in FIG. 11, the decorative part 7 extends in a width direction X of the electronic device 100. In other words, the through hole 1014 and the decorative part 7 are transversely arranged. The plurality of light-transmissive areas 721 of the protection board 72 are arranged in the width direction X of the electronic device 100. Correspondingly, the one or more camera modules 3 and the receive module 12 are arranged in the width direction X of the electronic device 100. The receive module 12 is located on a right side of the one or more camera modules 3. In this implementation, the transmitting area 1011 is located on the right side of the decorative part 7, and located in an arrangement direction of the plurality of light-transmissive areas 721. A location of the transmit module 11 corresponds to the location of the transmitting area 1011. The transmit module 11 is located on the right side of the receive module 12, and located in an arrangement location of the receive module 12 and the one or more camera modules 3. In another embodiment, the transmitting area (shown as a circular dotted line) may alternatively be arranged on a top side or a bottom side of the decorative part 7. The transmitting area and the light-transmissive area 721 that is opposite to the receive module 12 are arranged in a length direction Y of the electronic device 100. In this application, a limitation on a relative location of the transmit module 11, the receive module 12, and the one or more camera modules 3 is a limitation on a relative location of a central axis (for example, a receiving axis or a transmitting axis) of aligned angles of view.

In this application, the transmitting area 1011 of the back cover 101 may be formed in a plurality of manners. For example, the back cover 101 includes a glass substrate and a light-shielding coating that is located on the glass substrate and that faces one side of the circuit board 2. At least a partial area of the light-shielding coating allows invisible light to penetrate through, to form the transmitting area 1011. The light-shielding coating may be made of a material that shields visible light and allows invisible light to penetrate through. The light-shielding coating may alternatively be made of a material that shields invisible light, and form the transmitting area 1011 by thinning a part of the coating. The light-shielding coating may alternatively use a composite coating, for example, a material that allows invisible light to penetrate through, to form the transmitting area 1011, and form another area by using another material. Alternatively, the back cover 101 may be made of a metal material, to form a through hole in the transmitting area 1011, and a translucent plate is disposed in the through hole, to allow invisible light to penetrate through.

As shown in FIG. 12, the decorative part 7 extends in a width direction X of the electronic device 100. In other words, the through hole 1014 and the decorative part 7 are transversely arranged. The plurality of light-transmissive areas 721 of the protection board 72 are arranged in the width direction X of the electronic device 100. Correspondingly, the one or more camera modules 3 and the receive module 12 are arranged in the width direction X of the electronic device 100. The receive module 12 is located on a left side of the one or more camera modules 3. In this implementation, the transmitting area 1011 is located on the left side of the decorative part 7, and located in an arrangement direction of the plurality of light-transmissive areas 721. A location of the transmit module 11 corresponds to the transmitting area 1011. The transmit module 11 is located on the left side of the receive module 12, and located in an arrangement location of the receive module 12 and the one or more camera modules 3. In another embodiment, the transmitting area (shown as a circular dotted line) may be alternatively arranged on a top side or a bottom side of the decorative part 7. The transmitting area and the light-transmissive area 721 that is opposite to the receive module 12 are arranged in a length direction Y of the electronic device 100.

As shown in FIG. 13, the decorative part 7 extends in a length direction Y of the electronic device 100. In other words, the through hole 1014 and the decorative part 7 are vertically arranged. The plurality of light-transmissive areas 721 of the protection board 72 are arranged in the length direction Y of the electronic device 100. Correspondingly, the one or more camera modules 3 and the receive module 12 are arranged in the length direction Y of the electronic device 100. The receive module 12 is located on a bottom side of the one or more camera modules 3. In this implementation, the transmitting area 1011 is located on the bottom side of the decorative part 7, and located in an arrangement direction of the plurality of light-transmissive areas 721. A location of the transmit module 11 corresponds to the transmitting area 1011. The transmit module 11 is located on the bottom side of the receive module 12, and located in an arrangement location of the receive module 12 and the one or more camera modules 3. In another embodiment, the transmitting area (shown as a circular dotted line) may alternatively be arranged on a left side or a right side of the decorative part 7. The transmitting area and the light-transmissive area 721 that is opposite to the receive module 12 are arranged in a width direction X of the electronic device 100.

As shown in FIG. 14, the decorative part 7 extends in a length direction Y of the electronic device 100. In other words, the through hole 1014 and the decorative part 7 are vertically arranged. The plurality of light-transmissive areas 721 of the protection board 72 are arranged in the length direction Y of the electronic device 100. Correspondingly, the one or more camera modules 3 and the receive module 12 are arranged in the length direction Y of the electronic device 100. The receive module 12 is located on a top side of the one or more camera modules 3. In this implementation, the transmitting area 1011 is located on the top side of the decorative part 7, and located in an arrangement direction of the plurality of light-transmissive areas 721. A location of the transmit module 11 corresponds to the transmitting area 1011. The transmit module 11 is located on the top side of the receive module 12, and located in an arrangement location of the receive module 12 and the one or more camera modules 3. In another embodiment, the transmitting area (shown as a circular dotted line) may alternatively be arranged on a left side or a right side of the decorative part 7. The transmitting area and the light-transmissive area 721 that is opposite to the receive module 12 are arranged in a width direction X of the electronic device 100.

In this embodiment, because a part of the decorative part 7 is exposed to the outside of the electronic device 100, and the receive module 12 and the one or more camera modules 3 that are decorated by the decorative part 7 are similar, or even the same in appearance, the decorative part 7, the receive module 12, and the one or more camera modules 3 may basically be symmetrically distributed on the electronic device 100, so that the electronic device 100 is harmonious in appearance, and is more aesthetically appealing. The decorative part 7 can also prevent problems such as reduced structural strength and easy deformation caused by an excessively large volume due to an excessively large quantity of devices that need to be surrounded.

Optionally, referring to FIG. 8 and FIG. 9, the camera assembly 40 further includes a buffer member 8. The buffer member 8 is tightly pressed between the decorative part 7 and the camera bracket 4. Specifically, the buffer member 8 is located between the limiting part 716 of the decorative ring 71 and a top surface 45 (disposed opposite to a bottom surface 43) of the camera bracket 4. In this case, the back cover 101 tightly presses the camera bracket 4 on the fixing bracket 5 by using the limiting part 716 and the buffer member 8, so that the bottom surface 43 of the camera bracket 4 fixedly abuts against the bottom wall 551 of the mounting groove 55, and the camera bracket 4, the one or more camera modules 3 mounted on the camera bracket 4, and the receive module 12 can be fixed inside the housing 10, to avoid damage of components due to frequent shaking.

Optionally, referring to FIG. 8 and FIG. 9, the time-of-flight module 1 further includes a drive chip 13. The drive chip 13 is fixed to a side that is of the circuit board 2 and that faces away from the transmit module 11. A projection of the drive chip 13 on the circuit board 2 partially or completely overlaps a projection part of the transmit module 11 on the circuit board 2. That the projection of the drive chip 13 on the circuit board 2 completely overlaps the projection of the transmit module 11 on the circuit board 2 means that one completely falls within the range of the other.

In this embodiment, because the projection of the drive chip 13 on the circuit board 2 partially or completely overlaps the projection part of the transmit module 11 on the circuit board 2, the drive chip 13 and the transmit module 11 are respectively fixed, in an approximately opposite manner, to two sides of the circuit board 2 that face away from each other, so that cabling between the drive chip 13 and the transmit module 11 is relatively short, and parasitic inductance is relatively small, thereby ensuring that pulse waveform quality of the detection optical signal emitted by the transmit module 11 is relatively good, to increase a signal-to-noise ratio.

Through validation, a value of inductance between the drive chip 13 and the transmit module 11 in this embodiment is less than or equal to 0.3 nanohenries (nH), so that a use requirement of the time-of-flight module 1 can be met.

In this application, the receive module 12 includes a lens (lens) and a light sensitive chip (also referred to as an image sensor). The light sensitive chip is configured to convert an optical signal into an image signal. The light sensitive chip can transmit a signal to the drive chip 13, to enable the drive chip 13 to drive the transmit module 11 to emit the induction optical signal.

In this application, the controller 30 includes a processing chip and a memory chip. The memory chip stores a plurality of instructions that can be executed by the processor. The plurality of instructions correspond to a plurality of operation modes of the time-of-flight module 1. Each operation mode configures an operating status of the induction optical signal (for example, a pulse wave), including a frequency of the pulse wave (for example, 20 MHz, 50 MHz, or 100 MHz), integration time of the pulse wave, a duty cycle of the pulse wave, a corresponding frame rate, or the like.

When the processor receives a start signal, the processor invokes a corresponding instruction in the memory based on the start signal, and writes the instruction into a register of the light sensitive chip. The light sensitive chip sends a corresponding transmit signal to the drive chip 13 based on the instruction, and the drive chip 13 drives, based on the transmit signal, the transmit module 11 to emit the corresponding induction optical signal. In this case, an operating status of the induction optical signal corresponds to the start signal. For example, the start signal corresponds to a large aperture photographic effect, the corresponding instruction is a first instruction, and the processor may invoke the first instruction and write the first instruction into the register of the light sensitive chip. After a switch of the register is turned on, a corresponding transmit signal is sent to the drive chip 13, and the drive chip 13 drives, based on the transmit signal, the transmit module 11 to emit an induction optical signal corresponding to large aperture photography.

Optionally, the fixing bracket 5 further has an avoidance groove 57. The avoidance groove 57 is recessed from the first surface 51 to a direction that is close to the second surface 52. The drive chip 13 may be partially or completely received in the avoidance groove 57.

Optionally, the time-of-flight module 1 further includes a plurality of matching electronic elements 14. The plurality of matching electronic elements 14 include, but are not limited to a capacitor, an inductor, a resistor, and the like. The plurality of matching electronic elements 14 may reduce parasitic inductance between the drive chip 13 and the transmit module 11, to ensure waveform integrity of the detection optical signal emitted by the transmit module 11. The plurality of matching electronic elements 14 are fixed to a side that is of the circuit board 2 and that faces away from the transmit module 11. The plurality of matching electronic elements 14 are arranged around the drive chip 13. A projection of the plurality of matching electronic elements 14 on the circuit board 2 may partially or completely overlap the projection part of the transmit module 11 on the circuit board 2. The plurality of matching electronic elements 14 may be partially or completely received in the avoidance groove 57.

Figure 15:
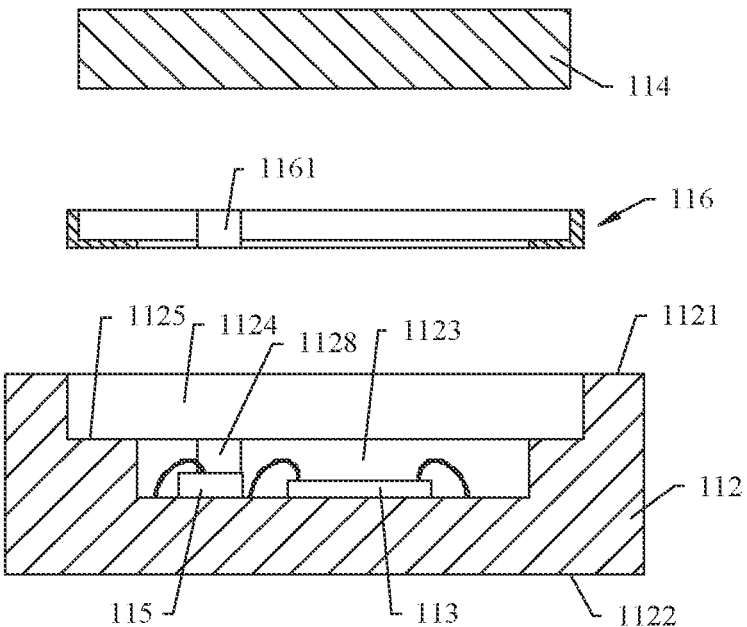
FIG. 15 is a schematic exploded view of a part of a transmit module in the structure shown in FIG. 8.

Optionally, referring to FIG. 8 and FIG. 15, FIG. 15 is a schematic exploded view of a transmit module in the structure shown in FIG. 8.

The transmit module 11 includes a holder 112, a transmitter 113, and a diffuser (diffuser) 114. The holder 112 has a top surface 1121 and a bottom surface 1122 that are disposed opposite to each other. The bottom surface 1122 of the holder 112 faces the circuit board 2. The holder 112 forms a transmission cavity 1123. The transmission cavity 1123 is located inside the holder 112. The holder 112 further has a positioning groove 1124. The positioning groove 1124 is recessed from the top surface 1121 of the holder 112 to a direction that is close to the bottom surface 1122 of the holder 112. The positioning groove 1124 is in communication with the transmission cavity 1123.

The transmitter 113 is configured to emit the detection optical signal. The transmitter 113 is received in the transmission cavity 1123 and fixed to the holder 112. The transmitter 113 may be a vertical cavity surface emitting laser (vertical cavity surface emitting Laser, VCSEL). In this case, there is no need to add a collimator lens to the inside of the transmit module 11, so that costs of manufacturing the transmit module 11 are lower, and manufacturing technology difficulty is lower.

The diffuser 114 is fixed to the holder 112 and covers the transmission cavity 1123. The diffuser 114 is located on the positioning groove 1124. The diffuser 114 is configured to increase an angle of view of the detection optical signal.

In this embodiment, an angle of view of the transmitting field of view of the transmitter 113 may be within the range from 15° to 25°. For example, the angle of view of the transmitting field of view of the transmitter 113 may be designed as 21°±3°. The transmit module 11 may enlarge the angle of view of the transmitting field of view of the transmitter 113 by using the diffuser 114, so that the transmitting field of view of the transmit module 11 has a relatively large angle of view. In other words, the diffuser 114 can diffuse a laser beam having a small angle to an angle of view required by the time-of-flight module 1. Because the transmit module 11 has a relatively large angle of view, a problem that the coverage between the transmitting field of view and the receiving field of view is decreased due to a relatively long spacing between the transmitting axis 111 of the transmit module 11 and the receiving axis 122 of the receive module 12 can be avoided, so that the spacing between the transmitting axis 111 of the transmit module 11 and the receiving axis 122 of the receive module 12 may be greater than that of the conventional time-of-flight module, thereby further improving arrangement flexibility of the transmit module 11 and the receive module 12.

The angle of view of the transmitting field of view of the transmit module 11 may be slightly greater than the angle of view of the receiving field of view of the receive module 12. In an embodiment, the angle of view of the receiving field of view of the receive module 12 is 64°×50°, and the angle of view of the transmitting field of view of the transmit module 11 is 68°×54°. The diffuser 114 is rectangular. The diffuser 114 can diffuse the field of view of 21° of the transmitter 113 to a field of view of 68°×54° in a square cone shape.

Figure 16:
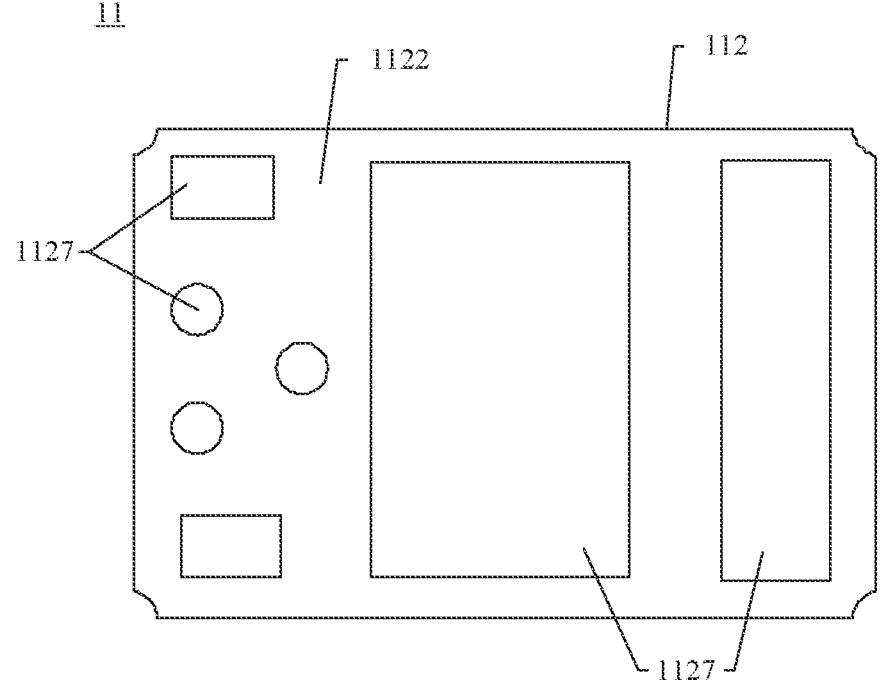
FIG. 16 is a bottom view of the transmit module shown in FIG. 10.

Optionally, the transmit module 11 may be welded on the circuit board 2 by using a surface mount technology (surface mount technology, SMT), Circuit cabling may be formed on the holder 112, the transmitter 113 is welded on the holder 112, and the holder 112 is welded on the circuit board 2, so that the transmitter 113 is electrically connected to the circuit board 2 by using the circuit cabling. Referring to FIG. 16, FIG. 16 is a bottom view of the transmit module 11 shown in FIG. 10. The bottom surface 1122 of the holder 112 is provided with a plurality of pads 1127. The plurality of pads 1127 weld the circuit board 2. The plurality of pads 1127 may be configured to transmit different signals.

The holder 112 may be an integrated ceramic structure. The holder 112 may be made of an aluminum nitride (Aluminum nitride, ALN) ceramic material. Because heat conductivity of the aluminum nitride ceramic material is better than that of another ceramic material, and a difference between a coefficient of thermal expansion (coefficient of thermal expansion, CTE) of the holder 112 and that of the transmitter 113 is smaller, the CTE of the holder 112 may still well match that of the transmitter 113 and maintain good strength even if the transmitter 113 is repeatedly heated, to ensure operation reliability of the time-of-flight module 1.

The transmit module 11 may further include a photodiode (photo diode, PD) 115. The photodiode 115 is received in the transmission cavity 1123 and fixed to the holder 112. The photodiode 115 is a monitoring component responsible for eye safety and skin safety, and is also responsible for automatic power control. The photodiode 115 is configured to: monitor light changes in the transmission cavity 1123 of the transmit module 11, convert received light into a corresponding current signal, and transmit the current signal to the drive chip 13, If the diffuser 114 is missing or broken, light in the transmission cavity 1123 changes. In this case, the light received by the photodiode 115 changes, and the photodiode 115 may convert the received light into the current light in a timely manner, and transmit the current light to the drive chip 13. The drive chip 13 is further configured to compare the current signal with a specified threshold. When the current signal is greater than the specified threshold, the time-of-flight module 1 is turned off, to prevent out-of-limit light emitted by the transmit module 11 from damaging human eye safety.

The transmit module 11 may further include a negative temperature coefficient (negative temperature coefficient, NTC) component (not shown in the figure). The negative temperature coefficient component is received in the transmission cavity 1123 and fixed to the holder 112. The negative temperature coefficient component is configured to: monitor a real-time temperature of the transmitter 113, and transfer the data to the drive chip 13 in real time, Because when the temperature exceeds a specified temperature (for example, 70° C.), light efficiency of the transmitter 113 may significantly be attenuated, and a great loss of the depth and the precision is caused, so that the system needs to monitor the temperature in real time. When receiving a signal detected by the negative temperature coefficient component, and learning that the temperature is about to reach the specified temperature, the drive chip 13 may control an increase in the temperature in some ways. For example, current output is reduced, or the time-of-flight module 1 is turned off when a temperature monitored by the negative temperature coefficient component reaches the specified temperature (where the temperature is usually higher than the specified temperature) by using a preset program.

Figure 17:
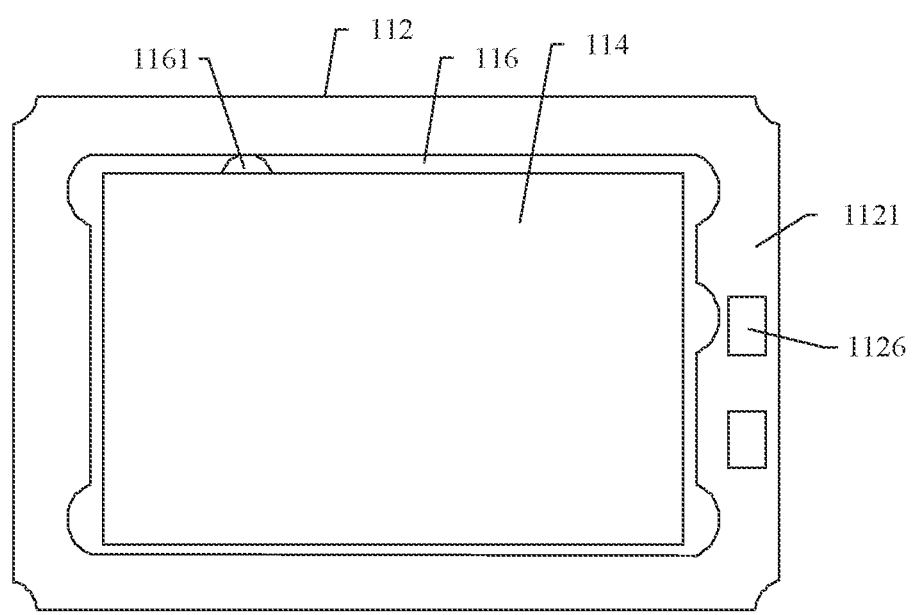
FIG. 17 is a top view of the transmit module shown in FIG. 10.

Optionally, referring to FIG. 9, FIG. 15, and FIG. 17, FIG. 17 is a top view of the transmit module 11 shown in FIG. 10. The transmit module 11 may further include adhesive glue 116. The adhesive glue 116 is connected between the holder 112 and the diffuser 114. For example, the adhesive glue 116 is adhered between the diffuser 114 and a groove wall 1125 of the positioning groove 1124. The adhesive glue 116 is configured to increase the degree of connection security between the holder 114 and the diffuser 112. The adhesive glue 116 is provided with one or more air vents 1161. The one or more air vents 1161 are in communication with the transmission cavity 1123 to the outside of the transmit module 11. Because when welded to the circuit board 2, the transmit module 11 needs to withstand baking at a high temperature of approximately 260° C., the one or more air vents 1161 can enable air that expands upon heating in the transmission cavity 1123 to flow to the outside of the transmit module 11, to avoid a case in which a structure of the transmit module 11 is destroyed because the air in the transmission cavity 1123 jacks up the diffuser 114 in the welding process.

A recessed area 1128 is formed on a wall surface of the transmission cavity 1123. The recessed area 1128 is in communication with the positioning groove 1124 and the transmission cavity 1123. The recessed area 1128 is in communication with the one or more air vents 1161, so that air in the transmission cavity 1123 can flow to the outside of the transmit module 11.

The top surface 1121 of the holder 112 is provided with one or more labeling areas 1126. The labeling area 1126 may be in a shape of a square, a circle, or a scribed line. This is not strictly limited in this application. In this case, a supplier or a model of the transmit module 11 may be determined based on a quantity of the labeling areas 1126, to avoid confusion due to a relatively small size of the transmit module and a similar appearance form of the body.

The foregoing descriptions are merely specific implementations of this application, but are not intended to limit the protection scope of this application. Any variation or replacement readily figured out by a person skilled in the art within the technical scope disclosed in this application shall fall within the protection scope of this application. The implementations in this application and features in the implementations can be mutually combined in a condition without inconsistency. Therefore, the protection scope of this application shall be subject to the protection scope of the claims.

Further embodiments of the present disclosure are provided in the following. It should be noted that the numbering used in the following section does not necessarily need to comply with the numbering used in the previous sections.

Embodiment 1. A camera assembly, comprising a time-of-flight module and a circuit board, wherein the circuit board is provided with an avoidance space, the time-of-flight module comprises a transmit module and a receive module, the transmit module is configured to emit a detection optical signal, the receive module is configured to receive an induction optical signal formed after the detection optical signal is reflected by a to-be-measured object, the receive module is located in the avoidance space, a connection end of the receive module is fixed to the circuit board, and the transmit module is located around the receive module and fixed to the circuit board.

Embodiment 2. The camera assembly according to embodiment 1, wherein the camera assembly further comprises one or more camera modules, the one or more camera modules are located in the avoidance space, and connection ends of the one or more camera modules are fixed to the circuit board.

Embodiment 3. The camera assembly according to embodiment 2, wherein the camera assembly further comprises a camera bracket located in the avoidance space, the camera bracket has a plurality of receiving grooves spaced apart from each other, and the receive module and the one or more camera modules are received in the plurality of receiving grooves in a one-to-one correspondence manner.

Embodiment 4. The camera assembly according to embodiment 3, wherein the camera assembly further comprises a fixing bracket, the circuit board is fixed to the fixing bracket, the fixing bracket has a mounting groove, and the camera bracket is fixed to the mounting groove.

Embodiment 5. The camera assembly according to embodiment 2, wherein the camera assembly further comprises a decorative part, the decorative part is located on a side of the receive module that receives the induction optical signal, the decorative part includes a plurality of mounting spaces, the receive module and the one or more camera modules are received in the plurality of mounting spaces, and the transmit module is located around the decorative part.

Embodiment 6. The camera assembly according to any one of embodiments 2 to 5, wherein the receive module and the one or more camera modules are arranged in a first direction, the receive module and the transmit module are arranged in a second direction, and the second direction is the same as the first direction, or the second direction is perpendicular to the first direction.

Embodiment 7. The camera assembly according to any one embodiments 1 to 5, wherein a spacing between a receiving axis of the receive module and a transmitting axis of the transmit module is within a range of 0.5 mm to 30 mm.

Embodiment 8. The camera assembly according to any one of embodiments 1 to 5, wherein the time-of-flight module further comprises a drive chip, the drive chip is fixed to a side of the circuit board facing away from the transmit module, and a projection of the drive chip on the circuit board partially or completely overlaps a projection of the transmit module on the circuit board.

Embodiment 9. The camera assembly according to any one of embodiments 1 to 5, wherein the transmit module comprises a holder, a transmitter, and a diffuser, the holder forms a transmission cavity, the transmitter is configured to emit the detection optical signal, the transmitter is received in the transmission cavity and fixed to the holder, the diffuser is fixed to the holder and covers the transmission cavity, and the diffuser is configured to increase an angle of view of the detection optical signal.

Embodiment 10. The camera assembly according to embodiment 9, wherein the holder is made of an aluminum nitride ceramic material.

Embodiment 11. The camera assembly according to embodiment 9, wherein the transmit module further comprises adhesive glue, the adhesive glue is connected between the holder and the diffuser, the adhesive glue is provided with one or more air vents, and the one or more air vents are in air communication with the transmission cavity to outside of the transmit module.

Embodiment 12. An electronic device, comprising a controller and the camera assembly according to any one embodiment 1 to 11, wherein the controller is electrically connected to the circuit board.

What is claimed is:

1. An electronic device, comprising:
   a circuit board comprising an avoidance space, wherein the avoidance space is surrounded on all sides by solid portions of the circuit board;
   a camera bracket located in the avoidance space and comprising a receiving groove;
   a time-of-flight circuit comprising:
      a receiver received in the receiving groove and comprising a connection end, wherein the connection end is fixed to the circuit board; and
      a transmitter located on the circuit board beside the receiver, wherein the receiver and the transmitter are individually packaged; and
   a back cover configured to receive the receiver and the transmitter, wherein the back cover is separated from the circuit board by the time-of-flight circuit.

2. The electronic device of claim 1, further comprising a camera located in the avoidance space, wherein a connection end of the camera is fixed to the circuit board.

3. The electronic device of claim 1, wherein the receiving groove comprises a first receiving groove and a second receiving groove, wherein the receiver is received in the first receiving groove, wherein the electronic device further comprises a camera, and wherein the camera is received in the second receiving groove.

4. The electronic device of claim 3, wherein the first receiving groove comprises a bottom wall, and wherein the receiver is bonded to the bottom wall using an adhesive member.

5. The electronic device of claim 4, wherein the adhesive member comprises thermally conductive particles, or wherein the adhesive member is made of a thermally conductive adhesive material.

6. The electronic device of claim 3, wherein the second receiving groove comprises a bottom wall, and wherein the camera is bonded to the bottom wall using an adhesive member.

7. The electronic device of claim 3, wherein the camera bracket further comprises a first connection notch, and wherein the connection end of the receiver extends out of the first receiving groove via the first connection notch to be fixed to the circuit board.

8. The electronic device of claim 3, wherein the camera bracket further comprises a second connection notch, and wherein the connection end extends out of the second receiving groove via the second connection notch to be fixed to the circuit board.

9. The electronic device of claim 1, further comprising a fixing bracket, wherein the fixing bracket comprises a mounting groove, and wherein the camera bracket is fixed in the mounting groove.

10. The electronic device of claim 1, further comprising a camera and a decorative part, wherein the decorative part is located on a side of the receiver that is configured to receive an induction optical signal, wherein the decorative part includes a plurality of mounting spaces, and wherein the receiver and the camera are received in the mounting spaces.

11. The electronic device of claim 1, further comprising a camera, wherein the receiver and the camera are arranged in a first direction, wherein the receiver and the transmitter are arranged in a second direction, and wherein either the second direction is the same as the first direction or the second direction is perpendicular to the first direction.

12. The electronic device of claim 1, wherein a spacing between a receiving axis of the receiver and a transmitting axis of the transmitter is within a range of 0.5 millimeters (mm) to 30 mm.

13. The electronic device of claim 1, wherein the time-of-flight circuit further comprises a drive chip, wherein the drive chip is fixed to a side of the circuit board facing away from the transmitter, and wherein a first projection of the drive chip on the circuit board partially or completely overlaps a second projection of the transmitter on the circuit board.

14. The electronic device of claim 1, wherein the transmitter comprises a holder, a transmitting circuit, and a diffuser, wherein the holder forms a transmission cavity, wherein the transmitting circuit is received in the transmission cavity and fixed to the holder, wherein the diffuser is fixed to the holder and covers the transmission cavity, wherein the diffuser is configured to increase an angle of view of a detection optical signal, and wherein the holder is fixed to the circuit board.

15. The electronic device of claim 14, wherein the holder is made of an aluminum nitride ceramic material.

16. The electronic device of claim 14, wherein the transmitter further comprises adhesive glue, wherein the adhesive glue is connected between the holder and the diffuser, wherein the adhesive glue is provided with one or more air vents, and wherein the one or more air vents are in fluid communication with the transmission cavity to outside of the transmitter.

17. The electronic device of claim 14, wherein an angle of view of the transmitting circuit is in a range of 15 degrees(°) to 25°.

18. The electronic device of claim 1, wherein the camera bracket is made of a metal material.

19. The electronic device of claim 1, wherein the transmitter and the connection end of the receiver are fixed on a same side of the circuit board, or wherein the transmitter and the connection end of the receiver are fixed on opposite sides of the circuit board.

20. The electronic device of claim 1, wherein the avoidance space comprises a through hole or a groove disposed on the circuit board.

* * * * *